United States Patent
Yang et al.

(10) Patent No.: US 10,187,656 B2
(45) Date of Patent: Jan. 22, 2019

(54) IMAGE PROCESSING DEVICE FOR ADJUSTING COMPUTATIONAL COMPLEXITY OF INTERPOLATION FILTER, IMAGE INTERPOLATION METHOD, AND IMAGE ENCODING METHOD

(71) Applicant: Samsung Electronics Co., Ltd., Suwon-si, Gyeonggi-do (KR)

(72) Inventors: Jung-yeop Yang, Seoul (KR); Ju-won Byun, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 69 days.

(21) Appl. No.: 15/176,579

(22) Filed: Jun. 8, 2016

(65) Prior Publication Data

US 2017/0070747 A1    Mar. 9, 2017

(30) Foreign Application Priority Data

Sep. 9, 2015    (KR) .................. 10-2015-0127703

(51) Int. Cl.
| | | |
|---|---|---|
| *G06K 9/32* | (2006.01) | |
| *H04N 19/587* | (2014.01) | |
| *H04N 19/70* | (2014.01) | |
| *H04N 19/147* | (2014.01) | |
| *H04N 19/117* | (2014.01) | |

(Continued)

(52) U.S. Cl.
CPC ......... *H04N 19/587* (2014.11); *H04N 19/117* (2014.11); *H04N 19/14* (2014.11); *H04N 19/147* (2014.11); *H04N 19/523* (2014.11); *H04N 19/70* (2014.11)

(58) Field of Classification Search
CPC .... H04N 19/523; H04N 19/513; H04N 19/59; H04N 19/57; H04N 19/80; H04N 7/014; H04N 7/0135; H04N 7/0142; G06T 7/223; G06T 3/4007

See application file for complete search history.

(56) References Cited

U.S. PATENT DOCUMENTS 8,325,821 B1 * 12/2012 Kizhepat ........... H04N 21/23434
                                                      375/240.26
8,750,378 B2    6/2014 Karczewicz et al.
(Continued)

FOREIGN PATENT DOCUMENTS

| JP | 4186582 B2 | 11/2008 |
|---|---|---|
| JP | 2015/095101 A | 5/2015 |
| KR | 2014/0124441 A | 10/2014 |

*Primary Examiner* — Eueng-Nan Yeh
(74) *Attorney, Agent, or Firm* — Harness, Dickey & Pierce, P.L.C.

(57) ABSTRACT

Provided are an image processing device capable of adjusting computational complexity, an image interpolation method, and an image encoding method. The image interpolation method includes selecting a horizontal interpolation filter having a first complexity, selecting a vertical interpolation filter having a second complexity, calculating pixel values of sub-pixels by performing an interpolation operation by using the selected horizontal and vertical interpolation filters, and generating interpolation information related to the selected horizontal interpolation filter and the selected vertical interpolation filter, wherein the first and second complexities are different from each other.

11 Claims, 27 Drawing Sheets

HOR→$a_{0,0}=(-A_{-3,0}+4A_{-2,0}-10A_{-1,0}+58A_{0,0}+17A_{1,0}-5A_{2,0}+A_{3,0})/64$
VER→$d_{0,0}=(-4A_{-1,0}+54A_{0,0}+16A_{0,1}-2A_{0,2})/64$

(51) Int. Cl.
*H04N 19/14* (2014.01)
*H04N 19/523* (2014.01)

(56) References Cited

U.S. PATENT DOCUMENTS

| | | |
|---|---|---|
| 8,897,360 B2 | 11/2014 | Cho et al. |
| 2007/0110159 A1 | 5/2007 | Wang et al. |
| 2012/0069906 A1 | 3/2012 | Sato |
| 2012/0170650 A1 | 7/2012 | Chong et al. |
| 2012/0230393 A1 | 9/2012 | Naing et al. |
| 2013/0182780 A1 | 7/2013 | Alshin et al. |
| 2014/0133546 A1 | 5/2014 | Bandoh et al. |
| 2014/0233634 A1* | 8/2014 | Alshina ............... H04N 19/176 375/240.02 |

\* cited by examiner $HOR \rightarrow a_{0,0} = (-A_{-3,0} + 4A_{-2,0} - 10A_{-1,0} + 58A_{0,0} + 17A_{1,0} - 5A_{2,0} + A_{3,0})/64$ $VER \rightarrow d_{0,0} = (-4A_{-1,0} + 54A_{0,0} + 16A_{0,1} - 2A_{0,2})/64$

FIG. 5

|  | 4-tap filter | 8-tap filter |
|---|---|---|
| HOR | 1-cycle/line (read) + 1-cycle/pixel (filtering) | 1-cycle/line (read) + 2-cycle/pixel (filtering) |
| VER | 4-cycle/line (read) + 1-cycle/pixel (filtering) | 8-cycle/line (read) + 2-cycle/pixel (filtering) |

FIG. 7A

| NUMBER OF TAPS | POSITION | BIT DEPTH ($2^n$) | FILTER COEFFICIENT |
|---|---|---|---|
| 8 | 1/4 | 512 | {−7, 29, −77, 456, 148, −52, 21, −6} |
| | | 256 | {−4, 15, −39, 228, 74, −26, 11, −3} |
| | | 128 | {−2, 7, −19, 114, 37, −13, 5, −1} |
| | | 64 | {−1, 4, −10, 57, 18, −6, 3, −1}<br>{−1, 4, −10, 57, 19, −7, 3, −1} |
| | 1/2 | 512 | {−5, 23, −79, 317, 317, −79, 23, −5} |
| | | 256 | {−3, 12, −40, 159, 159, −40, 12, −3} |
| | | 128 | {−1, 6, −20, 79, 79, −20, 6, −1} |
| | | 64 | {−1, 3, −10, 40, 40, −10, 3, −1}<br>{−1, 5, −12, 40, 40, −12, 5, −1}<br>{−1, 4, −11, 40, 40, −11, 4, −1} |
| | 1/8 | 256 | {−3, 10, −25, 248, 36, −15, 7, −2}<br>{−2, 8, −24, 249, 34, −13, 5, −1} |
| | | 128 | {−1, 4, −12, 123, 18, −6, 3, −1} |
| | | 64 | {−1, 3, −6, 62, 9, −4, 2, −1}<br>{−1, 2, −6, 62, 9, −4, 2, 0}<br>{−1, 2, −6, 62, 9, −3, 1, 0} |
| | 3/8 | 256 | {−6, 21, −49, 199, 119, −41, 19, −6}<br>{−6, 21, −48, 198, 119, −41, 19, −6}<br>{−4, 16, −44, 197, 117, −36, 13, −3} |
| | | 128 | {−3, 10, −24, 99, 59, −20, 9, −2} |
| | | 64 | {−2, 5, −11, 50, 29, −10, 5, −2}<br>{−2, 5, −12, 50, 30, −10, 4, −1} |

FIG. 7B

| NUMBER OF TAPS | POSITION | BIT DEPTH ($2^n$) | FILTER COEFFICIENT |
|---|---|---|---|
| 4 | 1/8 | 512 | {−23, 483, 59, −7} |
| | | 256 | {−12, 242, 30, −4} |
| | | 128 | {−5, 121, 14, −2} |
| | | 64 | {−3, 60, 8, −1}<br>{−3, 61, 7, −1} |
| | | 32 | {−1, 30, 4, −1}<br>{−2, 30, 4, 0} |
| | 1/4 | 512 | {−48, 446, 145, −31} |
| | | 256 | {−24, 223, 72, −151} |
| | | 128 | {−12, 111, 36, −7} |
| | | 64 | {−4, 54, 16, −2} |
| | | 32 | {−2, 27, 8, −1} |
| | 3/8 | 512 | {−55, 384, 227, −44} |
| | | 256 | {−27, 192, 114, −21} |
| | | 128 | {−14, 96, 57, −11}<br>{−13, 95, 56, −10} |
| | | 64 | {−4, 46, 25, −3}<br>{−5, 46, 26, −3}<br>{−5, 46, 27, −4} |
| | | 32 | {−2, 23, 12, −1}<br>{−2, 23, 13, −2} |
| | 1/2 | 512 | {−33, 289, 289, −33} |
| | | 256 | {−17, 145, 145, −17} |
| | | 128 | {−8, 72, 72, −8} |
| | | 64 | {−4, 36, 36, −4} |
| | | 32 | {−2, 18, 18, −2} |
| | | 16 | {−1, 19, 9, −1} |

FIG. 11

| $A_{0,0}$ | $A_{1,0}$ | $A_{2,0}$ | ⋯ | | | | | | | | | $A_{i,0}$ |
|---|---|---|---|---|---|---|---|---|---|---|---|---|
| $A_{0,1}$ | | | | | | | | | | | | |
| $A_{0,2}$ | | | | | N | | | | | | | |
| ⋮ | | | | $A_{00}$ | $A_{01}$ | $A_{02}$ | ⋯ | | | | | |
| | | | | $A_{10}$ | | | | —BLK | | | | |
| | | | M | $A_{20}$ | | | | | | | | |
| | | | | ⋮ | | | $A_{NM}$ | | | | | |
| $A_{0,j}$ | | | | | | | | | | | | $A_{i,j}$ |

Hor_val : Σ | M−Xi | / i × j
Ver_val : Σ | M−Xj | / i × j

FIG. 12B

EDGE IN HORIZONTAL DIRECTION : Filter_Hor COMPLEXITY > Filter_Ver COMPLEXITY
EDGE IN VERTICAL DIRECTION : Filter_Hor COMPLEXITY < Filter_Ver COMPLEXITY
EDGE IN DIAGONA DIRECTION : Filter_Hor COMPLEXITY ≠ Filter_Ver COMPLEXITY

FIG. 13B

COMPLEXITY (8 tap) : D1 + λR1 = Value 1
COMPLEXITY (4 tap) : D2 + λR2 = Value 2
(D : ERROR, λ : WEIGHT, R : HARDWARE SIZE)

FIG. 16

| pic_parameter_set_rbsp( ) { | Descriptor |
|---|---|
| ... | |
|   complexity_scalable_filt_enable_flag | u(1) |
|   if ( complexity_scalable_filt_enable_flag ) { | |
|     filt_tap_hor | se(v) |
|     filt_tap_ver | se(v) |
|   } | |
| ... | |

FIG. 19

| $A_{0,0}$ | $A_{0,1}$ | $A_{0,2}$ | $\cdots$ | | | | | | | | $A_{0,j}$ |
|---|---|---|---|---|---|---|---|---|---|---|---|
| $A_{1,0}$ | | | | | | | | | | | |
| $A_{2,0}$ | | | | | | | | | | | |
| $\vdots$ | | | | | | | | | | | |
| | | | | | | | | | | | |
| | | | | | | | | | | | |
| | | | | | | | | | | | |
| $A_{i,0}$ | | | | | | | | | | | $A_{i,j}$ |

Filter_Hor COMPLEXITY < Filter_Ver COMPLEXITY

IMAGE PROCESSING DEVICE FOR ADJUSTING COMPUTATIONAL COMPLEXITY OF INTERPOLATION FILTER, IMAGE INTERPOLATION METHOD, AND IMAGE ENCODING METHOD

CROSS-REFERENCE TO RELATED APPLICATION

This U.S. non-provisional application claims the benefit of priority to Korean Patent Application No. 10-2015-0127703, filed on Sep. 9, 2015, in the Korean Intellectual Property Office (KIPO), the disclosure of which is incorporated herein in its entirety by reference.

BACKGROUND

The inventive concepts relate to devices, systems, methods, and/or non-transitory media for image processing. More particularly, various example embodiments relate to image processing devices and image processing systems capable of adjusting computational complexity of an interpolation filter, image interpolation methods, and image encoding methods.

In general, an image processing device improves the data transmission efficiency of an image by encoding or decoding the image and transceiving the same. An image, e.g., one frame, is divided into a plurality of blocks by an image encoding method. Predictive encoding of the image is performed by performing inter-prediction and/or intra-prediction on each block.

Inter-prediction refers to a method of compressing an image by removing temporal redundancy between frames, and a representative example of inter-prediction is motion estimation encoding. In motion estimation encoding, each block of a current frame is predicted by using at least one reference frame to be encoded. For example, a reference block that is most similar to a current block is found within a prescribed search range by using a prescribed evaluation function.

In order to more accurately predict blocks of frames, interpolation is performed on a search range of the reference picture, pixel values of sub-pixels smaller than integer-pixels are generated, and inter-prediction is performed on the generated pixel values of sub-pixels. Computational complexity needs to be increased to more accurately generate pixel values of sub-pixels, and the time and/or the size required for resources for an interpolation operation may increase.

SUMMARY

The inventive concepts provides an image processing device capable of performing an efficient interpolation operation by adjusting computational complexity, an image interpolation method, and an image encoding method.

According to an aspect of the inventive concepts, there is provided an image interpolation method including selecting a horizontal interpolation filter having a first complexity setting, selecting a vertical interpolation filter having a second complexity setting, performing an interpolation operation on an input image using the selected horizontal and vertical interpolation filters, calculating pixel values of sub-pixels of the input image using results of the interpolation operation, generating interpolation information regarding the input image related to the selected horizontal interpolation filter and the selected vertical interpolation filter, and the first complexity setting and the second complexity setting are not equal.

The interpolation operation may include performing horizontal and vertical interpolation on pixel values of a plurality of pixels of a restored frame of the input image, and generating a reference frame having the pixel values of sub-pixels to be used for a motion estimation operation based on the results of the interpolation operation.

The image interpolation method may further include determining at least one image characteristic of the restored frame, wherein the first complexity setting and the second complexity setting are selected according to the determined image characteristic.

The determining of the at least one image characteristic of the restored frame may include determining a uniformity characteristic and an edge type of the restored frame.

The image interpolation method may further include determining a hardware characteristic by performing the interpolation operation, the determining including determining a degree of error of the interpolation operation, and adjusting at least one of the first complexity setting and the second complexity setting based on the degree of error of the interpolation operation, and selecting the first complexity setting and the second complexity setting according to the determined hardware characteristic.

The numbers of taps of the selected horizontal interpolation filter and the selected vertical interpolation filter may not be equal.

The image interpolation method may further include reading pixel values of a plurality of pixels of a restored frame, performing a horizontal interpolation operation using the horizontal interpolation filter with respect to pixel values of M pixels arranged horizontally in the restored frame, and performing a vertical interpolation operation using the vertical interpolation filter with respect to pixel values of N pixels arranged vertically in the restored frame, where M and N are each an integer of one or more.

The image interpolation method may further include selecting a vertical interpolation filter having a low complexity setting when the pixel values of N pixels are sequentially read during at least two read cycles, and selecting a horizontal interpolation filter having a low complexity setting when the pixel values of M pixels are sequentially read during at least two read cycles.

The image interpolation method may further include interpolation information that includes first information indicating whether to adjust the first complexity setting and the second complexity setting, and second information indicating a first complexity setting value and a second complexity setting value.

The first information and second information may be included in header information of a bit stream. The header information may include a sequence parameter set (SPS) network abstraction layer (NAL) IP block and a picture parameter set (PPS) NAL IP block. Each of the first information and second information may be included in any one of the SPS NAL IP block and the PPS NAL IP block.

According to another aspect of the inventive concepts, there is provided an image encoding method including selecting a horizontal interpolation filter and a vertical interpolation filter, the horizontal interpolation filter and the vertical interpolation filter each having a complexity setting, the respective complexity settings not being equal, performing an interpolation operation on an input image by using the selected horizontal interpolation filter and the selected vertical interpolation filter, performing motion estimation and compensation by using a reference frame related to the input image, the reference frame including pixel values of sub-pixels, and transmitting a bit stream including encoded image data and interpolation information related to the selected horizontal interpolation filter and the selected vertical interpolation filter.

The interpolation information may include information indicating a number of taps for the horizontal interpolation filter and the vertical interpolation. The interpolation information may include first information indicating whether to adjust the complexity setting of the horizontal interpolation filter and the complexity setting of the vertical interpolation filter, and second information indicating the complexity settings of the horizontal interpolation filter and the vertical interpolation filter. The interpolation information may include information for adjusting the complexity setting of the horizontal interpolation filter and the vertical interpolation filter by one frame unit, two or more frame units, or by block units, in one frame.

According to another aspect of the inventive concepts, there is provided an image encoding method including receiving, using at least one processor, an image, calculating, using the at least one processor, pixel values of sub-pixels associated with the received image in accordance with an interpolation operation, encoding, using the at least one processor, a bit stream based on a reference frame of the received image, the reference frame including the calculated pixel values of the sub-pixels, extracting, using the at least one processor, information from the bit stream, the extracted information including information regarding at least one of a tap number setting, a bit depth setting, a filter coefficient setting, and a position setting to use with the at least one interpolation filter, adjusting, using the at least one processor, a complexity setting of at least one interpolation filter based on the extracted information, interpolating, using the at least one processor, the encoded bit stream using the extracted information and the at least one interpolation filter, and outputting, using the at least one processor, the interpolated encoded bit stream to a display.

The encoding may include performing at least one of motion estimation and compensation using the reference frame.

The adjusting the complexity setting may include selecting a complexity setting for a horizontal interpolation filter and a complexity setting for a vertical interpolation filter based on the information regarding at least one of the tap number setting, the bit depth setting, the filter coefficient setting, and the position setting, and performing at least one interpolation operation using the selected complexity setting for the horizontal interpolation filter and the selected complexity setting for the vertical interpolation filter.

The selecting the complexity setting for the at least one interpolation filter may include selecting the complexity setting based on a desired amount of time required to complete an interpolation operation.

BRIEF DESCRIPTION OF THE DRAWINGS

The foregoing and other features of inventive concepts will be apparent from the more particular description of non-limiting example embodiments of inventive concepts, as illustrated in the accompanying drawings in which like reference characters refer to like parts throughout the different views. The drawings are not necessarily to scale, emphasis instead being placed upon illustrating principles of inventive concepts. In the drawings:

FIG. 5 is a table illustrating the number of cycles required for an interpolation operation, according to at least one example embodiment of the inventive concepts;

FIGS. 7A and 7B are tables illustrating coefficients of various interpolation filters according to at least one example embodiment of the inventive concepts;

FIGS. 11, 12A and 12B illustrate selection of horizontal and vertical interpolation filters according to at least one example embodiment of the inventive concepts;

FIGS. 13A and 13B are block diagrams of adjusting complexity of a interpolation filter according to a hardware characteristic, according to at least one example embodiment of the inventive concepts;

FIG. 16 is a table illustrating a network abstraction layer (NAL) unit generated by an image encoding device according to at least one example embodiment of the inventive concepts;

FIG. 19 illustrates selection of horizontal and vertical interpolation filters in an interpolation operation according to another exemplary embodiment of the inventive concepts;

DETAILED DESCRIPTION

Figure 1:
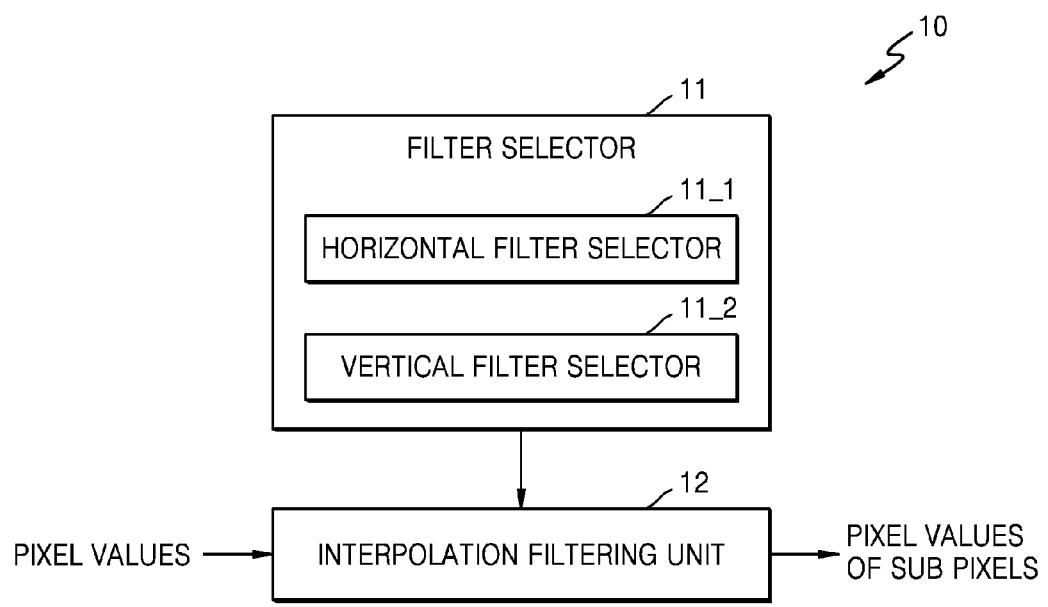
FIG. 1 is a block diagram of an interpolation unit in an image processing device according to at least one example embodiment of the inventive concepts.

Various example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments of inventive concepts to those of ordinary skill in the art. In the drawings, the thicknesses of layers and regions are exaggerated for clarity. Like reference characters and/or numerals in the drawings denote like elements, and thus their description may be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on"). As used herein the term "and/or" includes any and all combinations of one or more of the associated listed items.

It will be understood that, although the terms "first", "second", etc. may be used herein to describe various elements, components, regions, layers and/or sections. These elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof. Expressions such as "at least one of," when preceding a list of elements, modify the entire list of elements and do not modify the individual elements of the list.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

FIG. 1 is a block diagram of an interpolation unit 10 in an image processing device according to at least one example embodiment of the inventive concepts. The image processing device according to at least one example embodiment of the inventive concepts may include an image encoding device and an image decoding device.

For example, the interpolation unit 10 of FIG. 1 may calculate pixel values of sub-pixels of a reference frame of an image that may be used for inter-prediction by the image encoding device. Furthermore, the interpolation unit 10 may generate the reference frame by using a frame having pixel values of integer-pel-units, for example, a restored frame which is restored from an encoded original frame. Operations of the interpolation unit 10 may be controlled by a video encoding processor, a central processor, a graphic processor, etc., included in the image encoding device. Hereinafter, a pixel value of an integer-pel-unit may be referred to as a pixel on a concept contrasting to a sub-pel-unit. Also, a pixel of a sub-pel-unit may be referred to as a sub-pixel on a concept contrasting to an integer-pel-unit. Further, a pixel value of an integer-pel-unit may be referred to as a pixel value, and a pixel value of a sub-pel-unit may be referred to as a value of a sub-pixel (or, a sub-pixel value).

The interpolation unit 10 of FIG. 1 may perform an interpolation operation according to various image standards, such as, MPEG-2, H.264/AVC, VP8, HEVC, etc.

As illustrated in FIG. 1, the interpolation unit 10 may include a filter selector 11 and an interpolation filtering unit 12. Furthermore, the filter selector 11 may include a horizontal filter selector 11_1 and a vertical filter selector 11_2. A reference frame having pixel values of sub-pixels, and/or, sub-pixels, calculated by the interpolation filtering unit 12 may be provided to a prediction unit (not shown) performing motion estimation and compensation for inter-prediction.

The filter selector 11 may include information related to an interpolation filter having a variety of computational complexities, and may select respective interpolation filters according to at least one determination reference. For example, the filter selector 11 may select a horizontal interpolation filter for horizontal direction interpolation, and furthermore, may select a vertical interpolation filter for vertical direction interpolation. Additionally, the computational complexities of the horizontal interpolation filter and the vertical interpolation filter selected by the filter selector 11 may be different from each other. For example, the computational complexity of an interpolation filter may be determined by the number of taps of the filter, and the filter selector 11 may perform a filter selection operation such that, in interpolating one or more of the blocks, the number of taps of the horizontal interpolation filter is different from that of the vertical interpolation filter.

Furthermore, the term "computational complexity" may have various meanings. For example, an interpolation filter referred to as having a high computational complexity may refer to a filter which has a large amount of hardware resources, such as processing power, memory, etc., and is capable of performing a large amount of computation, and thus, the accuracy of the interpolation filter having the high computational complexity may be high. Hereinafter, computational complexity may be referred to as complexity, and the complexity of a filter may be widely understood with reference to various example embodiments of the inventive concepts.

In at least one example embodiment, the complexity of an interpolation filter may be adjustable and variously set by an adjustment method of a bit depth in computation operations of horizontal and vertical interpolation filters. According to other example embodiments, the complexity of an interpolation filter may be adjusted using an adjustment method of the number of taps of horizontal and vertical interpolation filters.

In at least one example embodiment, the filter selector 11 may select at least one interpolation filter (e.g., a horizontal and/or vertical interpolation filter) according to at least one characteristic of an image, and may perform interpolation based on the selected interpolation filters (e.g., the horizontal and/or vertical interpolation filters). For example, based on various characteristic(s) present in the image, the filter selector 11 may select a horizontal interpolation filter having high computational complexity when accurate calculation of pixel values of sub-pixels is required. As another example, the filter selector 11 may select a vertical interpolation filter having low computational complexity if relatively low accuracy is acceptable when calculating the pixel values of sub-pixels.

Furthermore, in at least one example embodiment, the filter selector 11 may select at least one interpolation filter (e.g., a horizontal and/or vertical interpolation filter) according to at least one hardware characteristic of an image encoding device. For example, according to at least one hardware characteristic of an image encoding device performing an interpolation operation, the filter selector 11 may determine fluctuation of image quality of an interpolation image corresponding to fluctuation in complexity of an interpolation filter, and may select at least one interpolation filter (e.g., a horizontal and/or vertical interpolation filter) capable of being improved and/or optimized according to the hardware characteristic(s). In other words, the filter selector 11 may determine a relationship between the amount of hardware resources (e.g., processing resources available, memory available, etc.) allocated to an interpolation filter used in an interpolation operation and the quality of an interpolation image corresponding to the amount of hardware resources, and may adjust the complexity settings of the horizontal and/or vertical interpolation filters according to the determined relationship. Similar to the above example embodiment, computational complexity of the horizontal interpolation filter may be different from that of the vertical interpolation filter according to a determined result of the hardware characteristic(s).

The interpolation filtering unit 12 may perform an interpolation computation using the selected interpolation filter(s), and may calculate pixel values of sub-pixels as a result. The interpolation filtering unit 12 may calculate a pixel value of a sub-pixel in any location of a frame by performing a computation operation using at least one of pixel values (or, pixel values of sub-pixels) adjacent to the sub-pixel. Furthermore, the interpolation filtering unit 12 may use a combination of pixel values of sub-pixels, which are already calculated, and at least one of pixel values adjacent to the sub-pixel.

In performing interpolation filtering, the number of pixels to be used in computations for generating a pixel value of each sub-pixel may be determined by the number of taps of a selected filter. For example, when a horizontal interpolation filter has eight taps, a pixel value of each sub-pixel may be calculated by using eight pixel values adjacent to the sub-pixel in a horizontal direction. As another example, when a vertical interpolation filter has four taps, a pixel value of each sub-pixel may be calculated by using four pixel values adjacent to the sub-pixel in a vertical direction.

Meanwhile, the above example embodiment describes horizontal and/or vertical direction interpolation during an interpolation operation, but the example embodiments of the inventive concepts are not limited thereto. For example, the interpolation operation may further include interpolation in a diagonal direction, and the filter selector 11 may further select an interpolation filter (for example, a diagonal interpolation filter) used for interpolation in a diagonal direction. In at least one example embodiment, computational complexity of a diagonal interpolation filter may be set different from the at least one horizontal interpolation filter and/or the at least one vertical interpolation filter.

Figure 2:
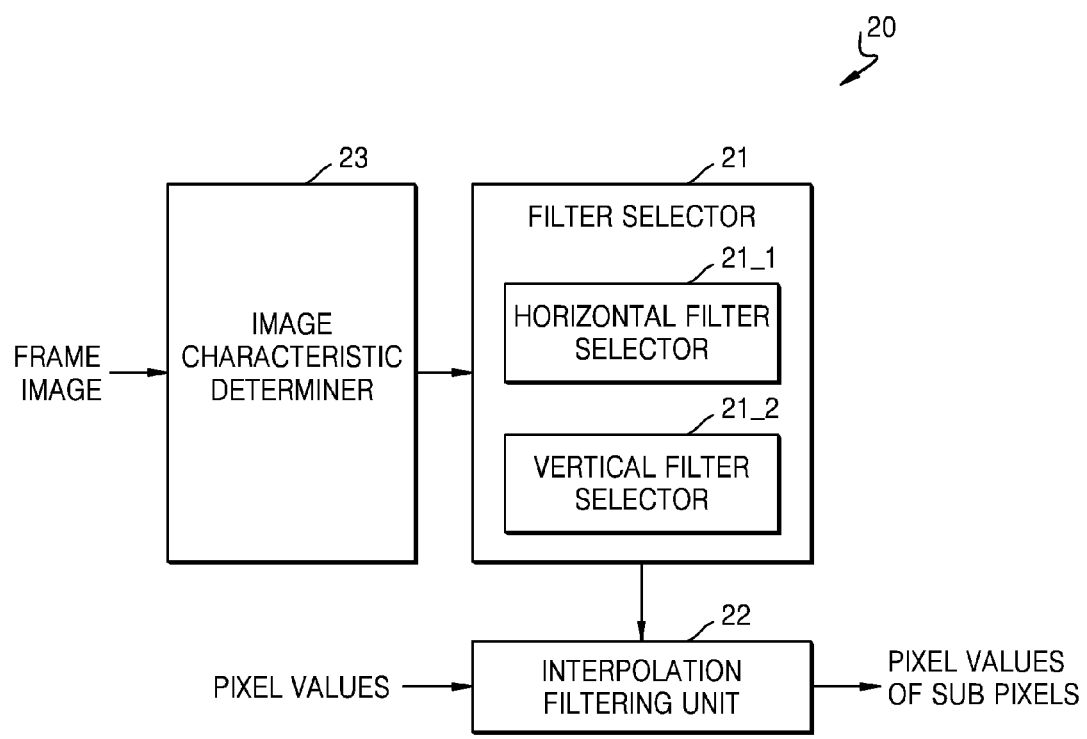
FIG. 2 is a block diagram of an interpolation unit in an image encoding device according to at least one example embodiment of the inventive concepts.

FIG. 2 is a block diagram of an interpolation unit 20 in an image encoding device according to at least one example embodiment of the inventive concepts. For example, the interpolation unit 20 according to at least one example embodiment may include a filter selector 21 and an interpolation filtering unit 22. Furthermore, the filter selector 21 may include a horizontal filter selector 21_1 and a vertical filter selector 21_2. Furthermore, the interpolation unit 20 may further include an image characteristic determiner 23.

According to at least one example embodiment of the inventive concepts, the image characteristic determiner 23 may receive a frame image and determine at least one characteristic of the frame image based on pixel values included in the frame image. For example, the image characteristic determiner 23 may determine at least one characteristic of the frame image in a horizontal direction and may provide the determined horizontal characteristic(s). As another example, the image characteristic determiner 23 may determine at least one characteristic of the frame image in a vertical direction and may provide the determined vertical characteristic(s). The frame image may be referenced for inter-prediction, and the frame image may be a restored frame including pixel values of a plurality of pixels, according to at least one example embodiment.

The filter selector 21 may select at least one interpolation filter (e.g., a horizontal and/or vertical interpolation filter) according to the determined characteristics with respect to the horizontal and/or vertical directions. In selecting the horizontal and/or vertical interpolation filters, similar to the above example embodiment, the filter selector 21 may adjust the computational complexity of an interpolation operation by selecting the number of taps for the horizontal and/or vertical interpolation filters. The interpolation filtering unit 22 may perform an interpolation computation according to the horizontal and/or vertical interpolation filters having adjusted computational complexity, or different computational complexities, and may calculate pixel values of sub-pixels from pixel values.

Figure 3:
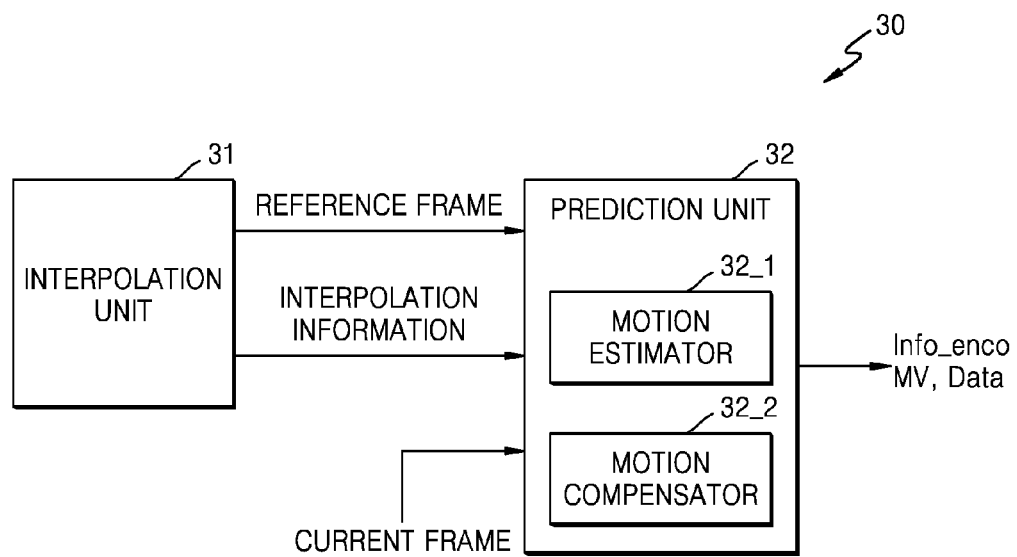
FIG. 3 is a block diagram of an image encoding device according to another exemplary embodiment of the inventive concepts.

FIG. 3 is a block diagram of an image encoding device 30 according to another example embodiment of the inventive concepts. For example, the image encoding device 30 may include an interpolation unit 31 and a prediction unit 32. The interpolation unit 31 may include a filter selector and an interpolation filtering unit according to the above example embodiment, but is not limited thereto. Furthermore, a filter selector may include a horizontal interpolation filter selector and a vertical interpolation filter selector. Furthermore, the interpolation unit 31 may further include an image characteristic determiner.

The interpolation unit 31 may generate a reference frame having pixel values of sub-pixels by using at least one interpolation filter (e.g., a horizontal and/or vertical interpolation filter) selected according to at least one of the above example embodiments, and may provide the generated reference frame to the prediction unit 32. The prediction unit 32 may include a motion estimator 32_1 and a motion compensator 32_2, according to at least one example embodiment, and may perform motion estimation and compensation by using a current frame and reference frame. A motion estimation (ME) operation may use estimation techniques defined a video compression systems such as MPEG and H.26x compression systems.

The prediction unit 32 may be defined as a unit performing an inter-prediction operation through motion estimation and/or compensation. The motion estimator 32_1, through a motion estimation of sub-pixels included in the reference frame, may generate a motion vector MV indicating the relative positions of a block of the current frame to be encoded, and a prediction block of the reference frame. Furthermore, the motion compensator 32_2 generates prediction data Data based on the generated motion vector MV. The prediction data Data may be generated based on a difference between pixel values of the block of the current frame and pixel values of the prediction block of the reference frame.

Meanwhile, the prediction unit 32 may provide various encoding information Info_enco related to an image encoding operation. For example, the prediction unit 32 may receive at least one piece of interpolation information related to an interpolation operation from the interpolation unit 31, and the interpolation information may be included in the encoding information Info_enco. The interpolation information may include a variety of information related to the interpolation operation, for example, information about whether to adjust the complexity of the horizontal and/or vertical interpolation filters, or information related to the complexity of the horizontal and/or vertical interpolation filters. The encoding information Info_enco may further include many other pieces of information related to motion estimation and compensation.

The generated motion vector MV, prediction data Data, and/or encoding information Info_enco may be encoded and included in a bit stream, and further, may be provided to an image decoding device. The image decoding device may extract a variety of information from the received bit stream and perform an image decoding operation based on the extracted information.

Figure 4:
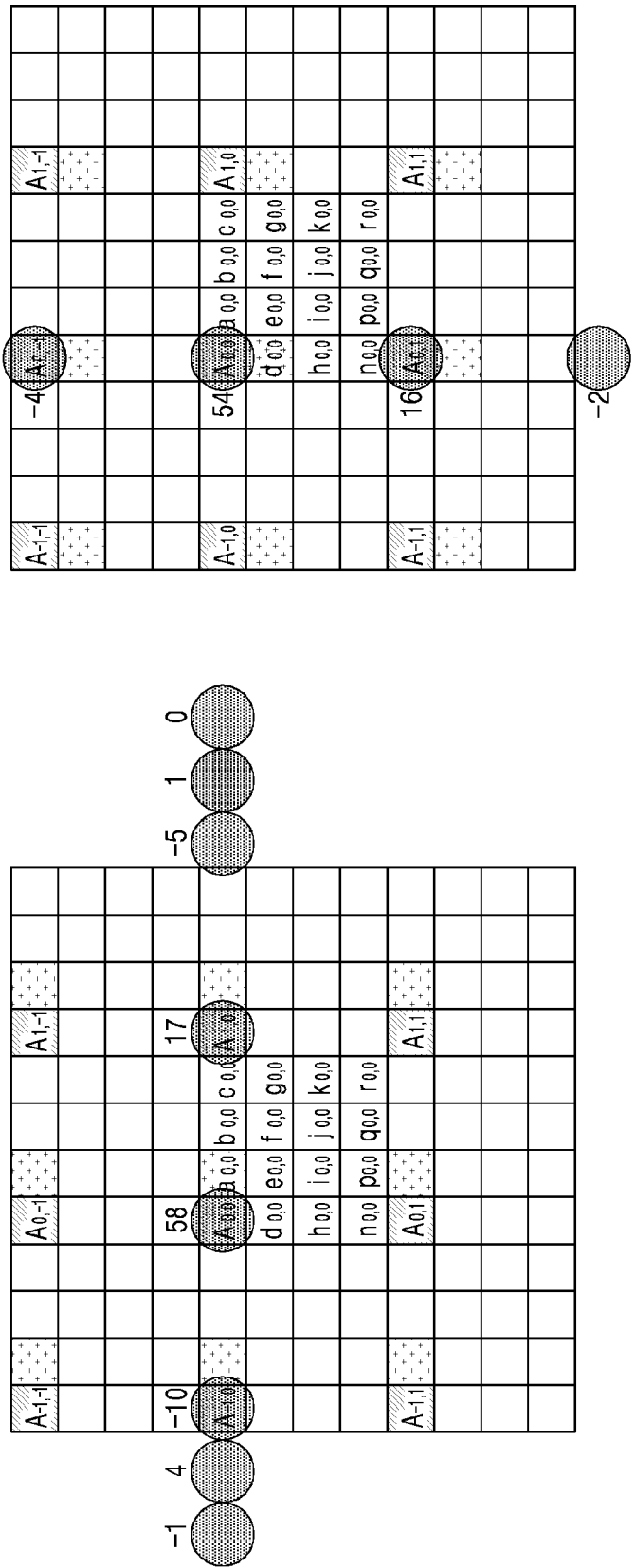
FIG. 4 illustrates calculation of pixel values of sub-pixels according to an interpolation operation, according to at least one example embodiment of the inventive concepts.

FIG. 4 illustrates calculation of pixel values of sub-pixels according to an interpolation operation, according to at least one example embodiment of the inventive concepts.

As illustrated in FIG. 4, a frame (for example, a restored frame) used for motion estimation includes pixel values, and pixel values of sub-pixels may be generated through an interpolation computation using the pixel values. In FIG. 4, pixels represented as uppercases $A_{-1,-1}$ through $A_{1,-1}$ denote pixels in an integer position, pixels represented as lowercases $a_{0,0}$ through $r_{0,0}$ denote sub-pixels in a fractional position. By an interpolation computation, pixel values of sub-pixels located at various positions, for example, ¼ position, ½ position, and ¾ position, etc., may be calculated.

According to the example embodiment described above, the interpolation computation is performed with respect to at least one pixel value by using the selected at least one interpolation filter (e.g., a horizontal and/or vertical interpolation filter). For example, pixel values of a portion of sub-pixels (for example, $a_{0,0}$, $b_{0,0}$, and $c_{0,0}$) may be calculated using horizontal interpolation filtering of a plurality of pixels $A_{-1,0}, A_{0,0}, A_{1,0}, \ldots$. Meanwhile, the remainder of the sub-pixels (for example, $d_{0,0}$, $h_{0,0}$, and $n_{0,0}$) may be calculated using vertical interpolation filtering of a plurality of pixels $A_{0,-1}, A_{0,0}, A_{0,1}, \ldots$. According to at least one example embodiment of the inventive concepts, the number of taps of the horizontal interpolation filter may be different from that of the vertical interpolation filter. FIG. 4 illustrates that the horizontal interpolation filter has eight taps and the vertical interpolation filter has four taps, but is not limited thereto.

The horizontal and vertical interpolation operations thereof may be performed according to Equation 1, according to at least one example embodiment.

$$\text{HOR} \rightarrow a_{0,0} = (-A_{-3,0} + 4A_{-2,0} - 10A_{-1,0} + 58A_{0,0} + 17A_{1,0} - 5A_{2,0} + A_{3,0})/64$$

$$\text{VER} \rightarrow d_{0,0} = (-4A_{-1,0} + 54A_{0,0} + 16A_{0,1} - 2A_{0,2})/64 \quad \text{[Equation 1]}$$

In Equation 1, filter coefficients are set in order to assign a weight to each pixel value, and a pixel value of each sub-pixel may correspond to a value that is the sum of the pixel values of a plurality of pixels multiplied by corresponding assigned weights.

FIG. 5 is a table illustrating the number of cycles required for an interpolation operation, according to at least one example embodiment of the inventive concepts. FIG. 5 is an example of a horizontal interpolation filter having eight taps and a vertical interpolation filter having four taps. Furthermore, a pixel values read operation and an interpolation computation operation performed during the interpolation operation are performed in synchronization with a prescribed clock, and the number of clock cycles in each operation performed is an example.

Referring to FIGS. 4 and 5, a plurality of pixels in a single frame in a horizontal direction may be used for a horizontal interpolation operation. Furthermore, when pixel values of the plurality of pixels included in the frame are read, pixels of one line unit (e.g., a plurality of pixels in one horizontal line) may be read together, and thus, the plurality of pixels used for the horizontal interpolation operation may be read together in one clock cycle. Meanwhile, as a plurality of pixels in a vertical direction are used for a vertical interpolation operation, the number of clock cycles required for reading the pixels in the vertical direction may correspond to the number of pixels used for the vertical interpolation operation. Furthermore, in a case of an interpolation filter having four taps, an interpolation computation operation may be completed in one clock cycle due to a relatively small amount of computation required for the interpolation computation operation, while in a case of an interpolation filter having eight taps, an interpolation computation operation may require two or more clock cycles for completion due to the relatively large amount of computation. In other words, the number of clock cycles necessary to be perform an interpolation computation operation is based on the complexity of the interpolation filter, and may be one or more clock cycles.

The amount of time required for an interpolation operation may correspond to the total time required to perform interpolation operations (e.g., a horizontal interpolation operation, a vertical interpolation operation, a horizontal interpolation operation, etc.). According to at least one example embodiment of the inventive concepts, because the amount of time required for reading pixels in a horizontal direction is relatively short during an horizontal interpolation operation, the interpolation operation is performed using a horizontal interpolation filter having a relatively large number of taps, and accordingly, improve the accuracy of the interpolation operation while decreasing and/or minimizing an increase in time for performing the horizontal interpolation operation. Meanwhile, because the amount of time required for reading pixels in a vertical direction during the vertical interpolation operation is relatively large, it is possible to reduce the number of clock cycles required for the read operation by performing the interpolation operation using a vertical interpolation filter having a relatively small number of taps. In other words, the amount of time required for an interpolation operation may be adjusted to conform to a desired amount of time by adjusting the horizontal and/or vertical interpolation filters used for the interpolation operation.

Figure 6A:
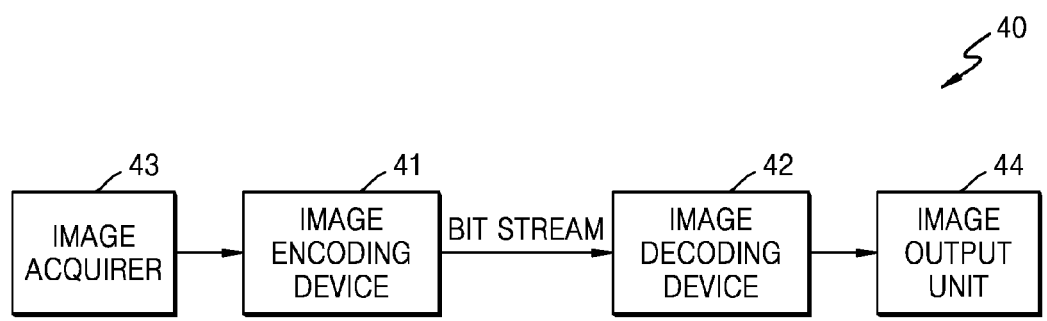
FIGS. 6A and 6B are views of an image processing system and a bit stream, according to at least one example embodiment of the inventive concepts.
Figure 6B:
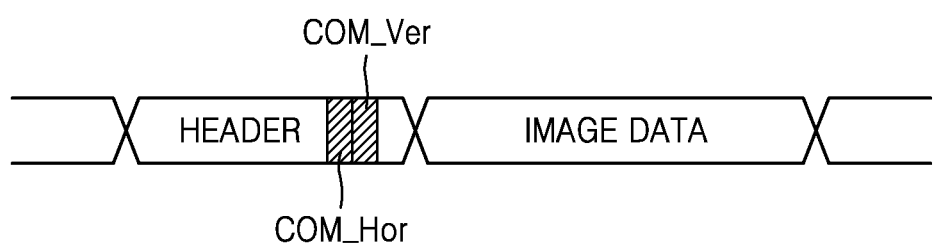

FIGS. 6A and 6B are views of an image processing system 40 and a bit stream, according to at least one example embodiment of the inventive concepts.

The image processing system 40 may include an image encoding device 41 and an image decoding device 42. The image encoding device 41 may calculate pixel values of sub-pixels by performing an interpolation operation according to at least one of the above example embodiments, and may perform motion estimation and/or compensation by using a reference frame having the pixel values of sub-pixels. Furthermore, the image decoding device 42 may extract information included in the bit stream and may then perform an interpolation operation and/or motion compensation based on the extracted information.

The image processing system 40 may further include an image acquirer 43 and an image output unit 44. The image acquirer 43 may receive an image provided from an external system. Additionally, the image acquirer 43 may generate an image via an image sensor, such as a charge coupled device (CCD) or a complementary metal-oxide semiconductor (CMOS) image sensor, included in the image acquirer 43. Meanwhile, the image output unit 44 may include a display for displaying a decoded image.

Referring to FIG. 6B, the bit stream may include header information Header that includes a variety of information related to image encoding, and encoded image data Image Data. The header information Header may include interpolation information related to a selection of at least one interpolation filter (e.g., a horizontal and/or vertical interpolation filter) according to the above example embodiment. For example, the header information Header may include information COM_Hor related to the complexity of a horizontal interpolation filter and/or information COM_Ver related to the complexity of a vertical interpolation filter.

The image decoding device 42 may store a table including filter coefficient information having various numbers of taps and bit depths. The image decoding device 42 may select horizontal and vertical interpolation filters from the table information based on information included in the header information Header.

FIGS. 7A and 7B are tables illustrating various interpolation filter coefficients according to at least one example embodiment of the inventive concepts. The filter coefficients of FIGS. 7A and 7B may be coefficients used for horizontal and vertical interpolation filters. Furthermore, the values illustrated in the tables of FIGS. 7A and 7B are only examples values and are not limited thereto, and instead may be variously changed with other suitable filter coefficient values, tap number values, position values, and bit depth values.

FIG. 7A illustrates various filter coefficients of filters having eight taps, and FIG. 7B illustrates various filter coefficients of filters having four taps. Furthermore, various filters (or, filter coefficients) may be selected according to a position of an interpolated sub-pixel, and information of filters to calculate pixel values of sub-pixels located at various positions, for example, $\frac{1}{8}$ position, $\frac{1}{4}$ position, $\frac{3}{8}$ position, and $\frac{1}{2}$ position, may be included therein. Furthermore, various filters (or filter coefficients) having respective bit depths at each tap and interpolation position may be selected based on various characteristics associated with the values, such as operation speed. For example, an operation speed of an interpolation filter having a small bit depth is faster that of an interpolation filter having a large bit depth.

According to at least one example embodiment of the inventive concepts, the complexities of interpolation filters (e.g., horizontal and/or vertical interpolation filter, etc.) may be adjusted. For example, a complexity of the horizontal interpolation filter may be adjusted by changing the number of taps of the horizontal interpolation filter as described above. For example, the filter of FIG. 7A, which has eight taps, may be selected in order to increase the computational complexity of the interpolation operation using the horizontal interpolation filter, while the filter of FIG. 7B, which has eight taps, may be selected in order to decrease the computational complexity of the interpolation operation using the horizontal interpolation filter.

Meanwhile, in another example embodiment of the inventive concepts, the complexity of a horizontal interpolation filter may be adjusted by changing a bit depth value. For example, an interpolation filter having eight taps and a bit depth of 9 bits may be used as the horizontal interpolation filter having high complexity. Meanwhile, an interpolation filter having eight taps and a bit depth of 6 bit may be used to decrease the complexity of the horizontal interpolation filter according to at least one example embodiment of the inventive concepts. In other words, in at least one example embodiment of the inventive concepts, complexity of an interpolation filter may be adjusted by changing other components (e.g., setting values) of the filters without changing the number of taps.

Figure 8:
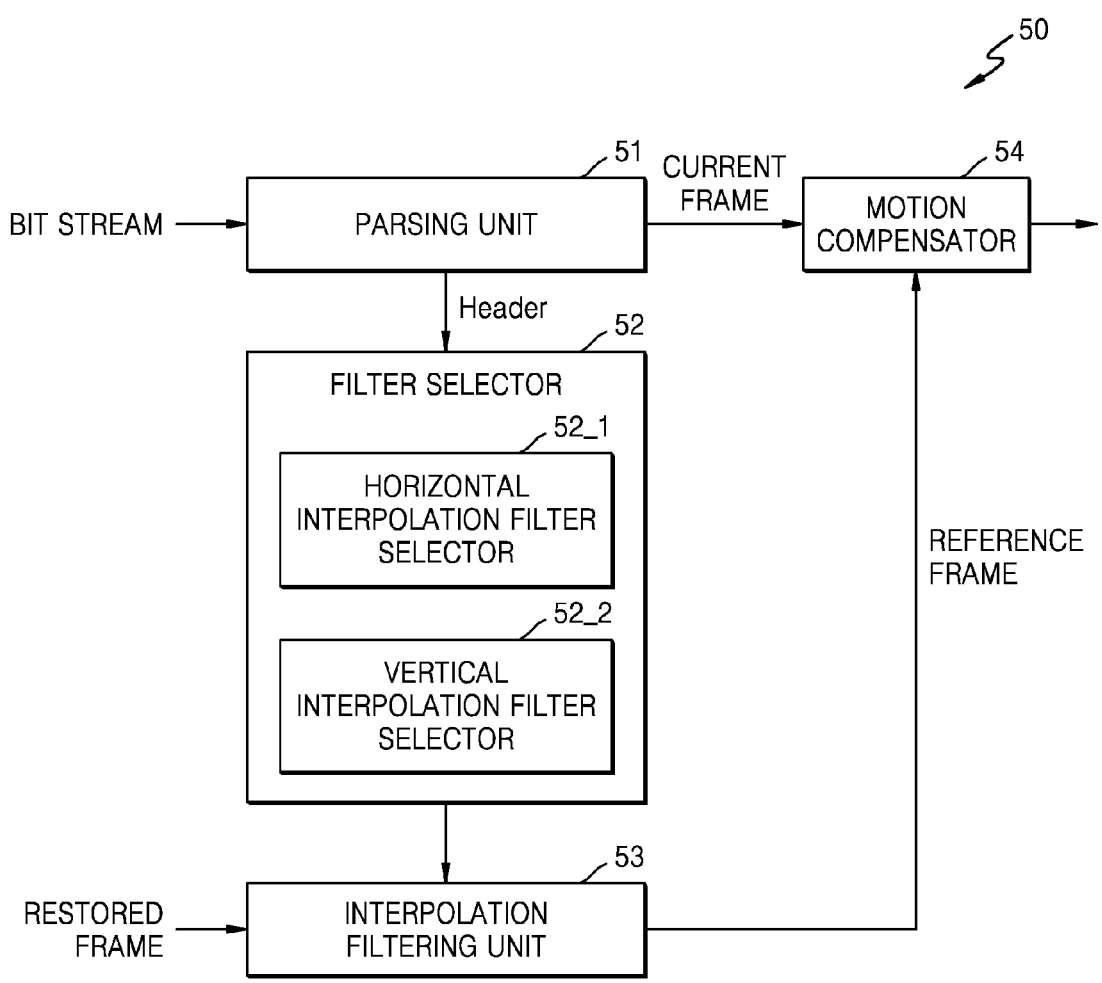
FIG. 8 is a block diagram of an image decoding device according to at least one example embodiment of the inventive concepts.

FIG. 8 is a block diagram of an image decoding device 50 according to at least one example embodiment of the inventive concepts. The image decoding device 50 may receive a bit stream, to which an interpolation operation and inter-prediction are applied, and may restore an original image from the received bit stream according to the above example embodiment.

The image decoding device 50 may include a parsing unit 51, a filter selector 52, an interpolation filtering unit 53, and a motion compensator 54. The bit stream generated in an image encoding device is provided to the parsing unit 51, and the parsing unit 51 parses encoded image data to be decoded and header information from the bit stream. The encoded image data and header information may be decoded, for example, using entropy decoding, inverse quantization, an inversion operation, and so on. Pixels values of a current frame corresponding to the decoded image data may be provided to the motion compensator 54. The motion compensator 54 may perform motion compensation by using pixel values from the provided current frame and the reference frame.

At least a part of the information (for example, interpolation information) included in header information Header may be provided to the filter selector 52. The header information Header may include additional information, for example, indicating whether to adjust the complexity of an interpolation filter using frames, or using blocks included in the frames. Furthermore, the header information Header may also include information indicating the complexities of the horizontal and vertical interpolation filters by frames, or by blocks included in the frames.

The filter selector 52 may adjust the complexity of a filter used for an interpolation operation, for example, by using the interpolation information included in the header information Header. The filter selector 52 may include horizontal and vertical interpolation filter selectors 52_1 and 52_2. The filter selector 52 may select horizontal and vertical interpolation filters in accordance with the interpolation information, with the number of taps in the horizontal and vertical interpolation filters possibly being different from each other.

The interpolation filtering unit 53 may calculate pixel values of sub-pixels by performing an interpolation computation according to the selected filter. For example, the interpolation filtering unit 53 may receive pixel values included in a restored frame, and may generate pixel values of sub-pixels located at various positions (for example, ¼ position, ½ position, ¾ position, and so on). The motion compensator 54 may perform motion compensation by using a motion vector parsed from the bit stream and the pixel values of the current frame and the reference frame.

Figure 9:
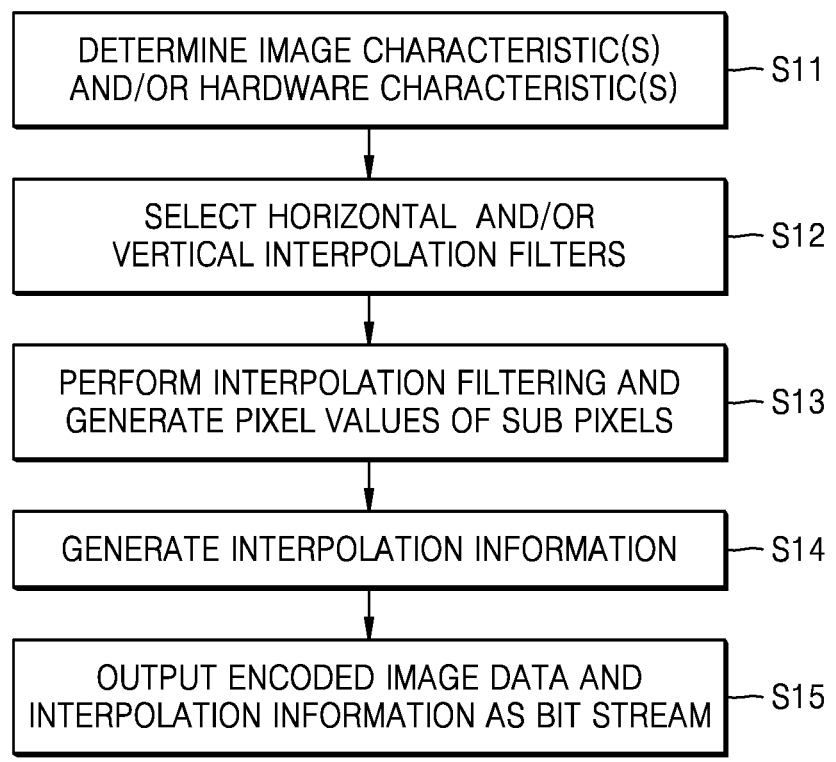
FIG. 9 is a flowchart illustrating an interpolation method of an image encoding device according to at least one example embodiment of the inventive concepts.

FIG. 9 is a flowchart illustrating an interpolation method of an image encoding device according to at least one example embodiment of the inventive concepts.

As illustrated in FIG. 9, the image encoding device determines at least one characteristic of an image to be encoded and/or at least one hardware characteristic related to an encoding operation in order to perform an interpolation operation using the horizontal and/or vertical interpolation filters (S11). The horizontal and vertical interpolation filters may have different complexity settings from each other. The horizontal and vertical interpolation filters may be selected based on at least one of the determined characteristics (S12).

An interpolation operation is performed using the selected interpolation filters. The interpolation filtering is performed by using, for example, various pixel values, and accordingly, pixel values of sub-pixels may be generated (S13). In addition, information indicating various interpolation methods applied during the interpolation operation is generated (S14), and the encoded image data and the interpolation information may be output as a bit stream (S15).

Figure 10:
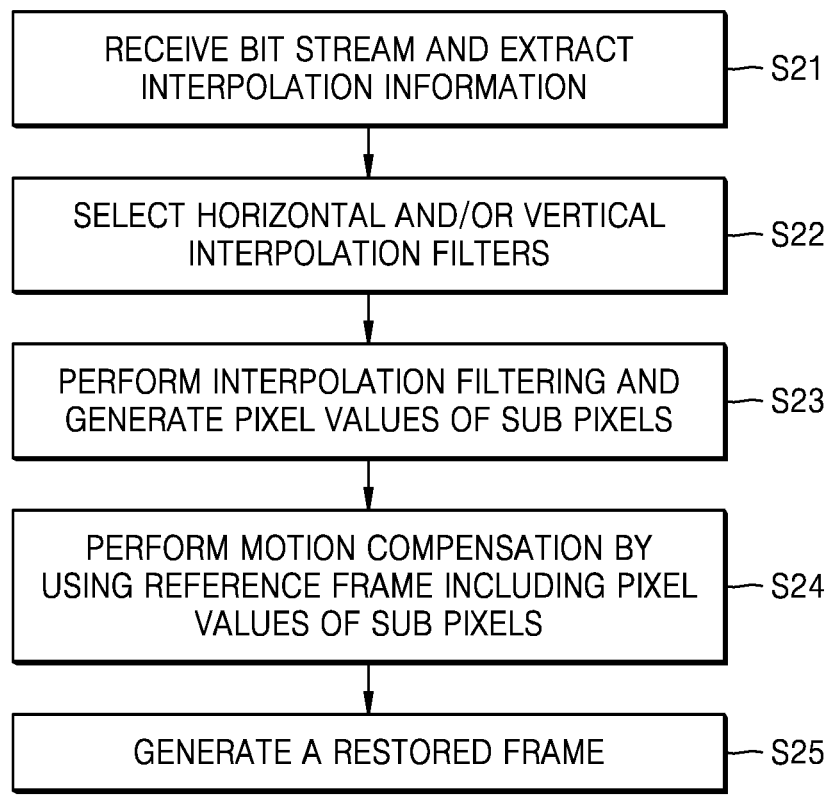
FIG. 10 is a flowchart illustrating an interpolation method of an image decoding device according to at least one example embodiment of the inventive concepts.

FIG. 10 is a flowchart illustrating an interpolation method of an image decoding device according to at least one example embodiment of the inventive concepts.

Referring to FIGS. 9 and 10, the image decoding device receives a bit stream generated by applying the interpolation method of FIG. 9, and extracts interpolation information using a corresponding parsing operation (S21). The image decoding device may store a variety of coefficient information used for an interpolation operation to generate pixel values of sub-pixels therein as a table. The extracted interpolation information may include information indicating whether to adjust the complexity of an interpolation filter and information regarding the complexity of the interpolation filter. The image decoding device selects horizontal and/or vertical interpolation filters based on the extracted interpolation information (S22). According to the above example embodiment, the number of taps in the horizontal filter may be different from the number of taps in the vertical interpolation filter. In other words, the image decoding device may select horizontal and vertical interpolation filters according to the number of the taps indicated by the interpolation information included in the bit stream.

Interpolation filtering may be performed for motion compensation, and pixel values of the sub-pixels may be generated based on the interpolation filtering (S23). The image decoding device may perform motion compensation by using a reference frame including pixel values of sub-pixels (S24), and may generate a restored frame with respect to a current frame using motion compensation and at least one post-processing operation (S25).

Figure 12A:
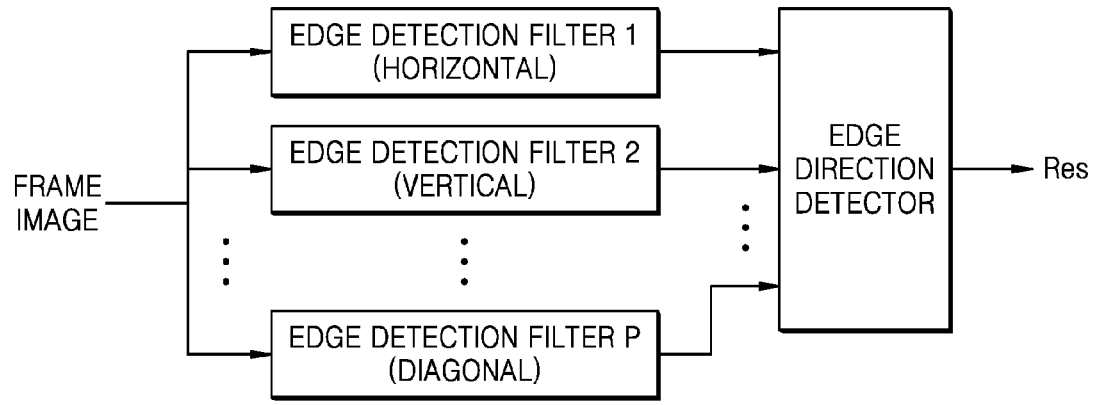

FIGS. 11, 12A and 12B illustrate selection of horizontal and vertical interpolation filters according to at least one example embodiment of the inventive concepts. For example, horizontal and vertical interpolation filtering may be performed on a frame including pixel values, and horizontal and/or vertical interpolation filters may be selected according to at least one determined image characteristic of a frame.

Referring to FIG. 11, a frame on which interpolation filtering is performed may include a plurality of pixels $A_{0,0}$ through $A_{i,j}$. For example, a frame may have a size of i+1 pixels, *j+1 pixels having i+1 pixels arranged in a horizontal direction and j+1 pixels, *j+1 pixels having i+1 pixels arranged in a vertical direction and j+1 pixels arranged in a vertical direction. It is assumed that each of the pixels $A_{0,0}$ through $A_{i,j}$ has a pixel value and the average number of pixel values of the frame is M.

As an example of determining the image characteristic according to at least one example embodiment, the respective degrees of uniformity of images in a horizontal direction and in a vertical direction may be determined. The degrees of uniformity may be determined by calculating a difference in pixel values in the horizontal and/or vertical directions. For example, image uniformity in a horizontal direction may be determined based on the sum of the absolute value of difference between a pixel value of each pixel and an average pixel value in a horizontal direction. Furthermore, image uniformity in a vertical direction may be determined based on the sum of the absolute value of difference between a pixel value of each pixel and an average pixel value in the vertical direction.

Meanwhile, the determination of the image characteristic may be performed according to desired and/or prescribed region units. For example, motion estimation and compensation may be performed by block BLK units including a desired and/or prescribed number of pixels, and the determination of the at least one image characteristic may be performed by block BLK units. Therefore, each block BLK may determine different image characteristics in the horizontal and/or vertical directions, and furthermore, each block BLK may select different horizontal and/or vertical interpolation filters.

For example, when determining the horizontal and vertical directions with respect to a block BLK having a size of N pixels*M pixels, an image characteristic Hor_val in a horizontal direction and an image characteristic Ver_val in a vertical direction may be determined using Equation 2, according to at least one example embodiment.

$$\text{Hor\_val} = \frac{1}{MN}\sum_i\sum_j |X_i - A_{ij}| \text{ where } X_i = \sum_j A_{ij} \quad [\text{Equation 2}]$$

$$\text{Ver\_val} = \frac{1}{MN}\sum_j\sum_i |X_j - A_{ij}| \text{ where } X_j = \sum_i A_{ij}$$

Meanwhile, as another example of determining at least one image characteristic, uniformity pixels in the horizontal and vertical directions may be determined by analyzing linearity between pixels as in Equation 3, according to at least one example embodiment.

$$\text{Hor\_val} = \sum_i |A_{i0} - 2A_{i1} + A_{i2}| + |A_{i1} - 2A_{i2} + A_{i3}| \quad [\text{Equation 3}]$$

$$\text{Ver\_val} = \sum_i |A_{0j} - 2A_{1j} + A_{2j}| + |A_{1j} - 2A_{2j} + A_{3j}|$$

If pixel values are uniformly distributed, pixel values of sub-pixels may be relatively accurately calculated even if using an interpolation filter having low complexity. Meanwhile, when fluctuation in the pixel values is large, accurate calculation of pixel values of sub-pixels using an interpolation filter having high complexity may be desired and/or required. Therefore, the complexities of the horizontal and/or vertical interpolation filters may be determined based on the determined image characteristics with respect to the horizontal and/or vertical directions. According to at least one example embodiment, if the difference of the pixel values in a vertical direction are greater than the difference of the pixel values in the horizontal direction, complexity of the vertical interpolation filter may be higher than that of the horizontal interpolation filter, or vice versa.

Meanwhile, FIGS. 12A and 12B illustrate determining at least one edge characteristic of a frame as an example of determining at least one image characteristic of a restored frame. Edges included in the frame, for example, include edges in the horizontal, vertical, and/or diagonal directions, and may be detected.

In at least one example embodiment, at least one edge included in a frame may be detected using one or more types of edge filters. For example, pixels included in the frame may be provided to at least one filter for detecting the edges in one or more directions (for example, edges in horizontal, vertical, and/or diagonal directions), and the edges may be detected by analyzing the values passed through the edge detection filters. As in the example embodiment illustrated in FIG. 12A, pixel values of a frame (and/or pixel values of a block in a frame) may be provided to a plurality of edge detection filters (for example, P), and output values of the edge detection filters may be provided to an edge direction detector. The edge direction detector may provide a result Res that includes information regarding the detection of an edge direction using desired and/or prescribed units (for example, block units).

According to the edge direction determined by the edge direction detector, the complexities of the horizontal interpolation filter and/or the vertical interpolation filter may be selected. For example, as illustrated in FIG. 12B, when an edge in a horizontal direction exists, a horizontal interpolation filter having relatively high complexity may be selected in order to accurately calculate pixel values of sub-pixels in a horizontal direction. Meanwhile, when an edge in a vertical direction exists, a vertical interpolation filter having relatively high complexity may be selected in order to accurately calculate pixel values of sub-pixels in a vertical direction. Meanwhile, when an edge in a diagonal direction exists, the complexities of horizontal and/or vertical interpolation operations may be set different from each other by considering the accuracy of, and the amount of time required for, an interpolation operation performed using the horizontal and/or vertical interpolation filters. In at least one example embodiment, when an image encoding device includes a diagonal interpolation filter, the image encoding device may set the computational complexity of the diagonal interpolation filter relatively high, and thus, may accurately calculate pixel values of sub-pixels in a diagonal direction.

Figure 13A:
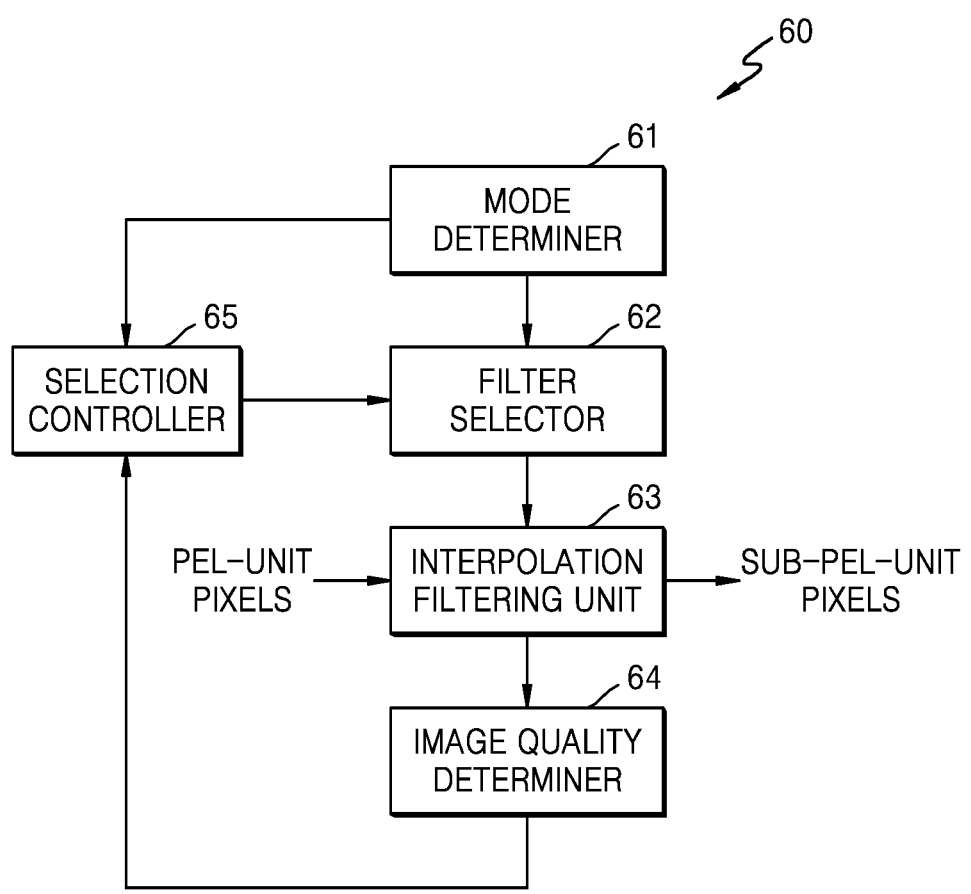

FIGS. 13A and 13B are block diagrams of adjusting the complexity of an interpolation filter according to at least one hardware characteristic, according to at least one example embodiment of the inventive concepts.

As illustrated in FIG. 13A, an image encoding device 60 may include a mode determiner 61, a filter selector 62, an interpolation filtering unit 63, an image quality determiner 64, and a selection controller 65. Since operations of the filter selector 62 and the interpolation filtering unit 63 are similar to or the same as, the filter selectors and interpolation filtering units described in the above example embodiments, repeated descriptions thereof are omitted.

Referring to FIGS. 13A and 13B, the mode determiner 61 may provide mode information related to a hardware size setting (for example, the complexity of the interpolation filter) of an interpolation operation and/or the accuracy (or degree of error) desired from the interpolation operation related thereto. The filter selector 62 may select at least one interpolation filter (e.g., a horizontal and/or vertical interpolation filter, etc.) according to the set mode information, and the interpolation filtering unit 63 may perform an interpolation computation by using the selected at least one interpolation filter (e.g., horizontal and/or vertical interpolation filter, etc.).

Pixel values of sub-pixels are calculated through the interpolation computation of the interpolation filtering unit 63, and the image quality determiner 64 may determine the degree of error of the interpolation operation based on the calculated pixel values of sub-pixels. As in FIG. 13B, when the degree of error D and a hardware size R are expressed together as a numerical value, values of the degree of error D and the hardware size R may be inversely proportional to each other. In other words, the degree of error D may become smaller as the hardware size R (e.g., the complexity setting of an interpolation filter) becomes larger. Furthermore, according to at least one hardware characteristic of an image encoding device performing an interpolation operation, a value related to the hardware size R and the degree of error D (for example, the sum of the values of the hardware size R and the degree of error D, Value 1 and Value 2, etc.) may be different from each other.

Respective image qualities of the horizontal interpolation filter and/or the vertical interpolation filter is determined according to various modes, and a resultant value Value may be calculated based on the results of the interpolation operation(s). For example, a resultant value Value 1 may be associated with the use of an interpolation filter having a complexity of eight taps, and a resultant value Value 2 may be associated with the use of an interpolation filter having a complexity of four taps. Once the Value 1 and/or Value 2 has been calculated, the horizontal interpolation filter and/or the vertical interpolation filter may be selected based on the calculated Value. For example, a small resultant value may indicate that a small degree of error D is generated by using hardware having a small hardware size R, and therefore, a filter used for an interpolation operation may be selected based on the types of modes described above and/or the determined image qualities. The selection controller 65 may provide information for controlling the selection of the horizontal interpolation filter and/or horizontal interpolation filter by using the mode information and resultant value.

Meanwhile, λ of FIG. 13B denotes a weight assigned to a hardware size, and the hardware size may be used as a factor for selecting the complexity of an interpolation filter. For instance, the hardware size may be used as a main factor for selecting the complexity of an interpolation filter when the value of λ is large.

Meanwhile, a complexity adjustment operation of an interpolation filter using a characteristics test as described above may be realized using various types of devices. For example, as the characteristics test is performed with respect to each frame in real time (or at a delayed time), filter information selected in every frame may be encoded to be included in a bit stream. Additionally, the characteristics test may be performed by a plurality of frame units and/or by block units in a frame, and a filter selection operation related thereto may be performed. Moreover, the complexities of the at least one interpolation filter (e.g., the horizontal, vertical, horizontal, etc., interpolation filters) may be respectively selected by the characteristics test, in which the complexities of the interpolation filters are different from each other, and an interpolation operation may be performed according to the selected information.

Figure 14:
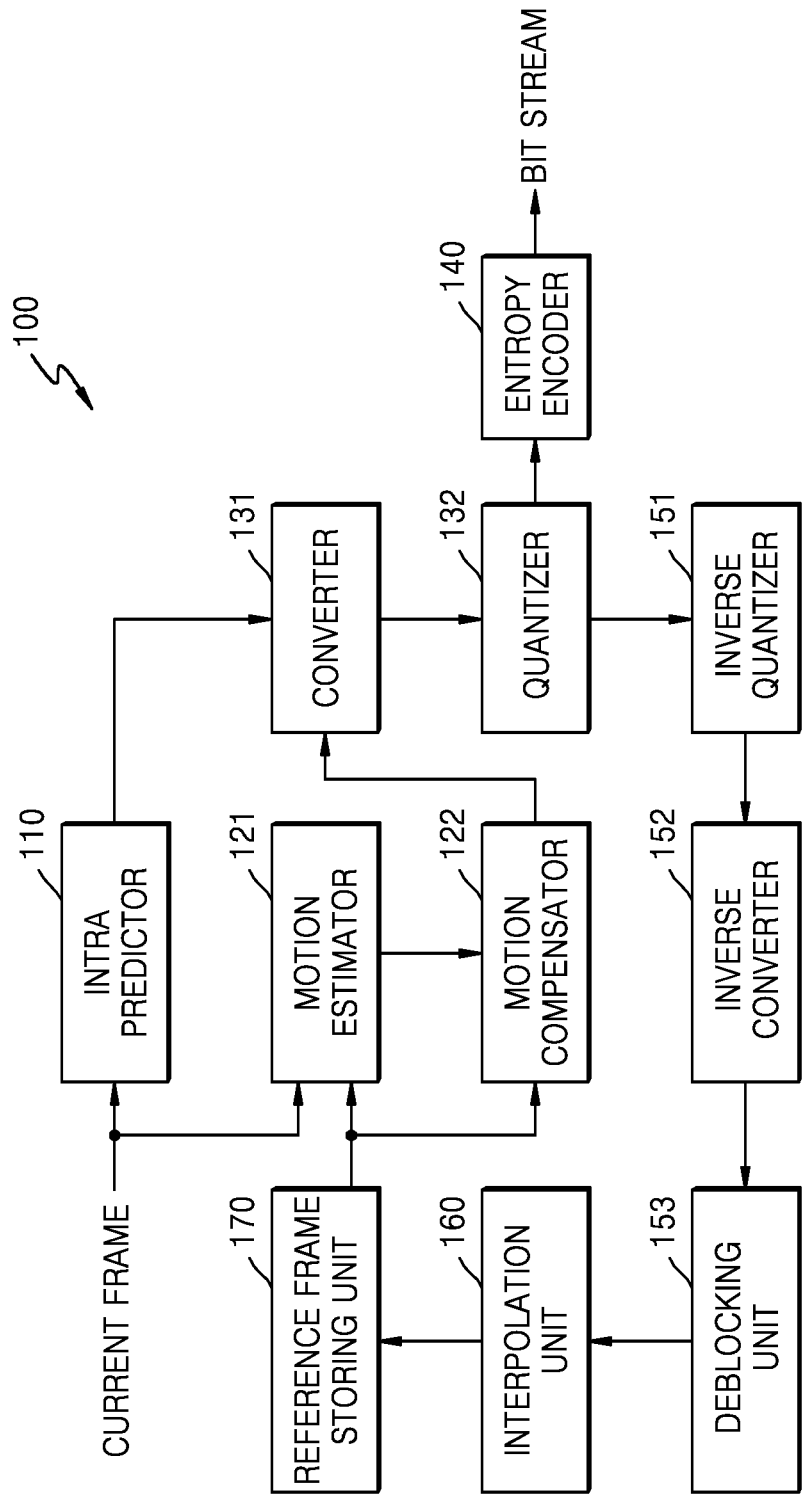
FIG. 14 is a block diagram illustrating a specific configuration of an image encoding device according to at least one example embodiment of the inventive concepts.

FIG. 14 is a block diagram illustrating a specific configuration of an image encoding device 100 according to at least one example embodiment.

The image encoding device 100 may include an intra predictor 110, a motion estimator 121, and a motion compensator 122. The intra predictor 110 performs intra-prediction with respect to an encoding unit using a current frame when in an intra mode. Furthermore, the motion estimator 121 and the motion compensator 122 may perform motion estimation and compensation by using a current frame and a reference frame when in an inter mode.

Data output from the intra predictor 110 and the motion compensator 122 is output as a quantized conversion coefficient after passing through a converter 131 and a quantizer 132. The quantized conversion coefficient is restored as data of a space region through an inverse quantizer 151 and an inverse converter 152, and the restored data of the space region is post-processed by a deblocking unit 153. A restored frame from the deblocking unit 153 is provided to an interpolation unit 160 according to the above example embodiment and a reference frame having pixel values of sub-pixels is generated. The reference frame may be stored in a reference frame storing unit 170. Meanwhile, the quantized conversion coefficient may be output as a bit stream after passing through an entropy encoder 140.

The interpolation unit 160 performs an interpolation operation by using at least one interpolation filter (e.g., a horizontal, and/or a vertical interpolation filter, etc.), in which the complexities thereof are adjusted, according to at least one example embodiment of the inventive concepts. Therefore, the interpolation unit 160 may improve the accuracy of a motion estimation operation and reduce the amount of time required for the interpolation operation. In at least one example embodiment, the interpolation unit 160 may also be provided in the motion estimator 121 and/or the motion compensator 122, and a restored frame having pixel values may be stored in the reference frame storing unit 170. The interpolation unit 160 provided in the motion estimator 121 and/or the motion compensator 122 receives a restored frame of pixel units from the reference frame storing unit 170, and may calculate the pixel values of sub-pixels using a corresponding interpolation operation.

Figure 15:
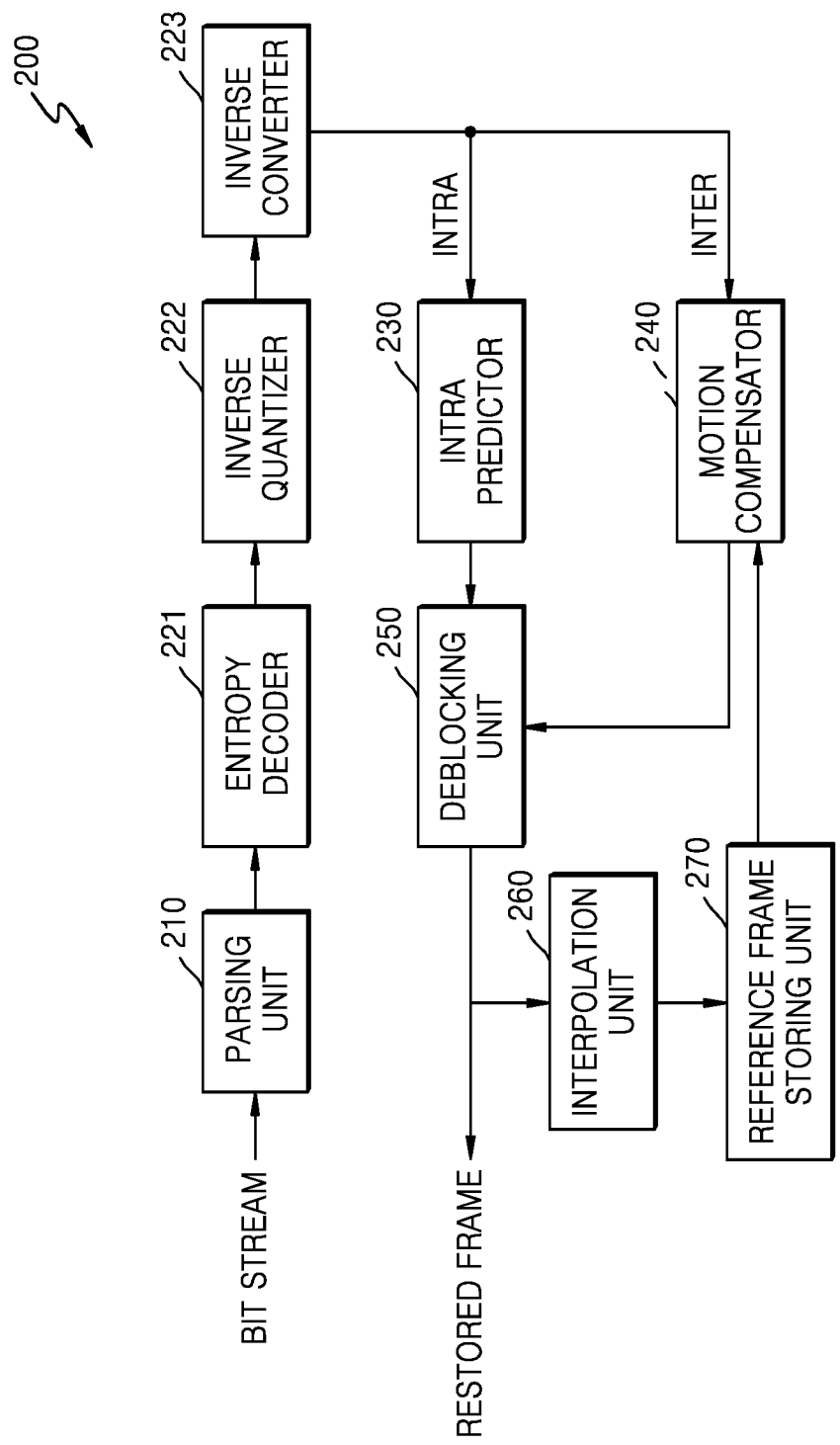
FIG. 15 is a block diagram illustrating a specific configuration of an image decoding device according to at least one example embodiment of the inventive concepts.

FIG. 15 is a block diagram illustrating a specific configuration of an image decoding device 200 according to at least one example embodiment of the inventive concepts.

Referring to FIG. 15, the image decoding device 200 may include a parsing unit 210, an entropy decoder 221, an inverse quantizer 222, and an inverse converter 223. Furthermore, the image decoding device 200 may further include an intra predictor 230, a motion compensator 240, and a deblocking unit 250. Furthermore, in order to generate a reference frame having pixel values of sub-pixels to be used for a motion compensation operation, the image decoding device 200 may further include an interpolation unit 260 and a reference frame storing unit 270.

A bit stream from an image encoding device is provided to the parsing unit 210. The parsing unit 210 parses the encoded image data bit stream and extracts information from the parsed bit stream desired and/or required for decoding the image data. The encoded image data is output as inverse quantized data after passing through the entropy decoder 221 and the inverse quantizer 222, and image data of a space region may be restored after the inverse quantized data is passed through the inverse converter 223. Referring to the image data of the space region, the intra predictor 230 performs intra-prediction with respect to an encoding unit in an intra mode, and the motion compensator 240 performs motion compensation using a reference frame with respect to the encoding unit in inter mode. The image data of the space region passed through the intra predictor 230 and the motion compensator 240 may be post-processed when the image data is passed through the deblocking unit 250 and may be output as a restored frame. Furthermore, the interpolation unit 260 may perform an interpolation operation according to at least one of the above example embodiments with respect to the restored frame, and may generate a reference frame having pixel values of sub-pixels.

The interpolation unit 260 may select at least one interpolation filter (e.g., a horizontal and/or vertical interpolation filter, etc.) according to the interpolation information included in a bit stream, and may perform an interpolation operation using the same. For example, the bit stream may include information indicating whether to adjust the complexities of horizontal interpolation filter and/or vertical interpolation filter for desired and/or prescribed regions (for example, by frames or by blocks, etc.), and furthermore, may include information about the complexity setting of each of the at least one interpolation filter (e.g., the complexity of the horizontal and/or vertical interpolation filters). Pieces of the interpolation information may be restored and provided to the interpolation unit 260.

As a transformable example embodiment, the image decoding device 200 may adjust the complexities of the horizontal and vertical interpolation filters according to at least one example embodiment of the inventive concepts even when interpolation information is not included in a bit stream generated through an encoding process. For example, as described in the above example embodiment, the image decoding device 200 may include a function block (not shown) analyzing at least one image characteristic, and an analyzing operation of the at least one image characteristic may be performed in a manner similar to, or the same as, the analyzing operation in the above image encoding device.

According to at least one example embodiment, a value may be calculated by the operation of analyzing the at least one image characteristic (for example, the degree of uniformity, the edge characteristic, etc.) and the filter complexity may be defined (in advance or in real-time) based on the calculated value and a desired and/or prescribed threshold. For example, as shown in Table 1 below, the image characteristic (for example, the degree of uniformity, the edge characteristic, etc.) may be determined according to a comparison result of the calculated value and the desired threshold, and the complexities of the at least one interpolation filter (e.g., the horizontal and vertical interpolation filters) may be selected according to the comparison result.

TABLE 1

| Filter_tap | Hor_val | Ver_val |
|---|---|---|
| 4 | Hor_val ≤ T0 | Ver_val ≤ T0 |
| 6 | T0 < Hor_val ≤ T1 | T0 < Ver_val ≤ T1 |
| 8 | T1 < Hor_val | T1 < Ver_val |

In other words, even if information related to the horizontal and vertical interpolation filters is not included in a bit stream provided to an image encoding device, the image decoding device 200 may autonomously select the complexities of the horizontal and vertical interpolation filters by using the same or a similar method of selecting the complexities of various filters described in the above example embodiment. For example, even when the complexities of the horizontal and vertical interpolation filters are selected according to an edge characteristic of the image described above, the image decoding device 200 may determine the edge characteristic of the image described above and may select the complexities of the horizontal and vertical interpolation filter based on the determined edge characteristic.

FIG. 16 is a table illustrating a network abstraction layer (NAL) unit generated by an image encoding device. For example, the image encoding device may provide units indicating a variety of information related to an image encoding operation, and the NAL unit may include a video parameter set (VPS) NAL unit, a sequence parameter set (SPS) NAL unit, and a picture parameter set (PPS) NAL unit. FIG. 16 illustrates an example of information related to an interpolation operation according to at least one example embodiment of the inventive concepts, which is included in the PPS NAL unit.

FIG. 16 illustrates an example of the syntax of the PPS according to at least one example embodiment. For example, the flag information (complexity_scalable_filt_enable_flag) may be included in the PPS and may be used to determine the adjustment setting of the complexity of an interpolation filter. The filter complexity may be adjusted according to a flag value u(1) in an interpolation operation. For example, when the flag value u(1) indicates deactivation of an adjustment function of the filter complexity, the image decoding device may perform an interpolation operation using desired (or alternatively, preset) horizontal and/or vertical interpolation filters.

When the flag value u(1) included in the PPS indicates the activation of the adjustment function of the filter complexity, the PPS may further include information indicating the complexity setting of a horizontal interpolation filter filt_tap_hor and information indicating the complexity setting of a vertical interpolation filter filt_tap_ver. For example, an image decoding device may confirm a flag value u(1) and select horizontal and vertical interpolation filters according to the complexity information of the horizontal and vertical interpolation filters (for example, information about the number of taps, se(v)) included in the PPS when the adjustment function of the filter complexity is activated.

FIG. 16 illustrates syntax of the PPS; however, various types of information related to an interpolation operation may be included in a bit stream according to various example embodiments of the inventive concepts. For example, the flag value u(1) and the information of the number of taps se(v) may be included in the VPS NAL unit or the SPS NAL unit.

FIGS. 17A through 17C and FIG. 18 illustrate formats of header information according to at least one example embodiment of the inventive concepts.

Figure 17A:
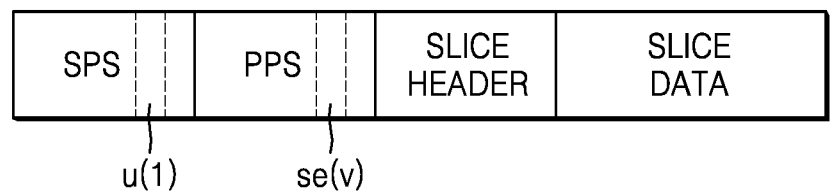
FIGS. 17A through 17C and FIG. 18 illustrate formats of header information according to at least one example embodiment of the inventive concepts.
Figure 17B:
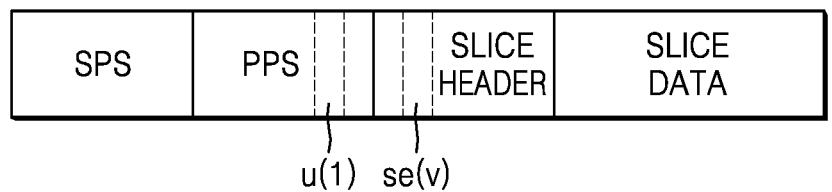
Figure 17C:
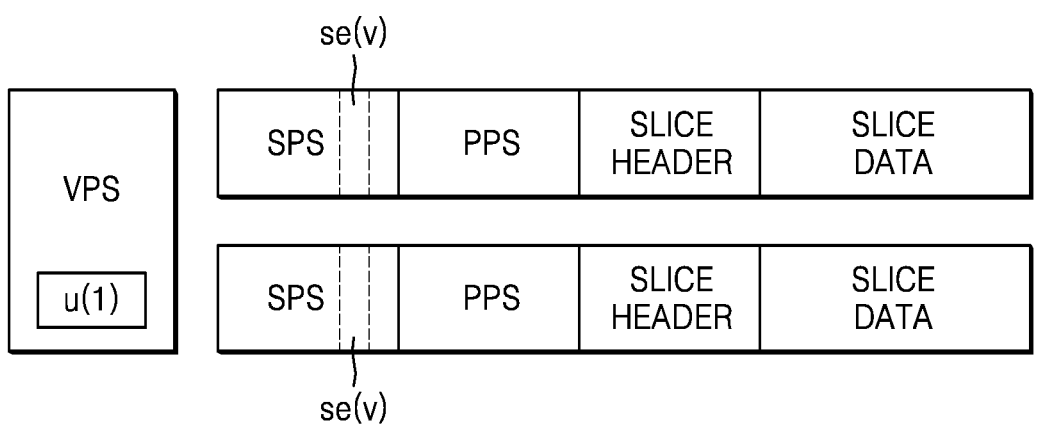

As described above, the header information provided in a bit stream may include various kinds of NAL units, and the header information may include a VPS NAL unit, an SPS NAL unit, a PPS NAL unit, and a slice header as illustrated in FIGS. 17A through 17C. According to the position of interpolation information according to at least one example embodiment of the inventive concepts in the header information, an interpolation operation for calculating pixel values of sub-pixels by various methods may be performed.

FIG. 17A illustrates an example of a flag value u(1) indicating whether to adjust complexity of an interpolation filter, which is included in an SPS NAL unit. An image decoding device may extract the flag value u(1) from the SPS NAL unit and determine, based on the flag value u(1), whether to extract complexity information se(v) of horizontal and vertical interpolation filters according to the flag value u(1). The complexity information se(v) may be included in a PPS NAL unit, and the interpolation filter may adjust the number of taps of the horizontal and vertical interpolation filters by frames according to the extracted complexity information se(v).

Meanwhile, referring to FIG. 17B, a flag value u(1) indicating whether to adjust the complexity of an interpolation filter may be included a PPS NAL unit, and the image decoding device may extract complexity information se(v) from a desired and/or prescribed location in the header information (for example, a slice header). The number of taps of horizontal and vertical interpolation filters may be selected according to the complexity information se(v). For example, complexities of the horizontal and vertical interpolation filters may be adjusted by slice data units.

Meanwhile, Referring to FIG. 17C, a flag value u(1) indicating whether to adjust complexity of an interpolation filter may be included a VPS NAL unit, and the image decoding device may extract complexity information se(v) from a desired and/or prescribed location in the header information (for example, an SPS NAL unit). For example, the number of taps of the horizontal and vertical interpolation filters may be adjusted by a plurality of frame units.

Figure 18:
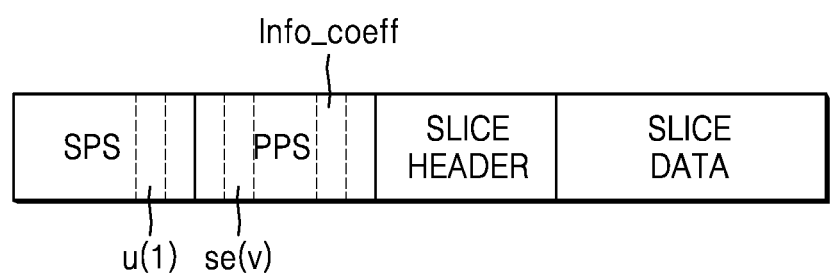

Meanwhile, referring to FIG. 18, header information may further include information regarding values of a plurality of filter coefficients to be used for an interpolation computation during an interpolation operation other than the flag value u(1) and complexity information se(v) described above. For example, the complexity may be adjusted by adjusting the number of taps of an interpolation filter according to at least one example embodiment of the inventive concepts; therefore, the filter coefficients to be used for an interpolation computation may be changed. An image encoding device may encode information of the filter coefficients used for an interpolation computation during image encoding and add the same to a bit stream.

The image decoding device extracts a flag value u(1) from an SPS NAL unit and other pieces of information related to an interpolation operation according to the flag value u(1). For example, it is possible to extract complexity information se(v) of each of the horizontal and vertical interpolation filters and coefficient information Info_coeff to be used for horizontal and vertical interpolation operations. FIG. 18 illustrates an example in which the complexity information se(v) and coefficient information Info_coeff are included in a PPS NAL unit, but the header information may be variously transformed according to at least one example embodiment of the inventive concepts.

FIG. 19 illustrates selection of horizontal and vertical interpolation filters in an interpolation operation according to another example embodiment of the inventive concepts. For example, horizontal and vertical interpolation filtering may be performed with respect to a frame including pixel values, and the complexities of the at least one interpolation filter (e.g., the horizontal and/or vertical interpolation filters, etc.) may be selected in consideration of the amount of time required for the interpolation operation, for example, the amount of time required for a pixel read cycle and an interpolation computation cycle to complete.

Unlike an actual image, when storing the pixel values corresponding to the frame in an image encoding device or an image decoding device, the pixel values in a horizontal direction may be stored in a vertical direction in a memory, and the pixel values in a vertical direction may be stored in a horizontal direction in a memory. For example, pixels $A_{0,0}$ through $A_{i,0}$ corresponding to a horizontal line in an actual image may be stored in an image encoding device or an image decoding device in a vertical direction. It is required to read a plurality of pixel values located perpendicular to the memory for horizontal interpolation of the image. In this case, read cycles of the pixel values during a horizontal interpolation operation may increase.

According to at least one example embodiment, the complexities of at least one interpolation filter (e.g., a horizontal and/or vertical interpolation filter) may be selected by considering a data storing state of the frame. For example, in consideration of a data storing state of the frame, the complexity of a vertical interpolation filter may be set higher than that of a horizontal interpolation filter; therefore, a vertical interpolation filter having a relatively large number of taps may be selected. Meanwhile, the horizontal interpolation filter may have a relatively small number of taps to reduce the number of clock cycles required for pixel reading.

Figure 20:
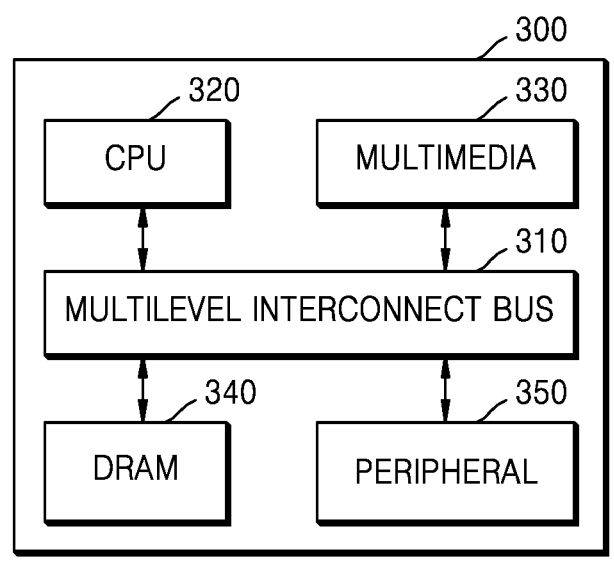
FIG. 20 is a block diagram of an application processor including an image encoding device and/or an image decoding device according to at least one example embodiment of the inventive concepts.

FIG. 20 is a block diagram of an application processor 300 including an image encoding device and/or an image decoding device according to at least one example embodiment of the inventive concepts. The application processor 300 may be realized as various types of devices, for example, as a system on chip (SoC). The SoC may be realized by integrating a system having several functions into a semiconductor chip, and a plurality of intellectual property (IP) blocks may be integrated into the SoC. Each of the plurality of IP blocks realized in the SoC may perform a specific function, such as the function of the interpolation filter unit, prediction unit, filter selector, etc., described above.

The application processor 300 may include various IP blocks interconnected, for example, via an interconnect bus 310 acting as a system bus, a central processing unit (CPU) 320 connected thereto, a multimedia unit 330, a memory device 340 (for example, DRAM), and a peripheral circuit 350.

The interconnect bus 310 may be realized as a bus to which a protocol adhering to a prescribed bus standard is applied. For example, advanced microcontroller bus architecture (AMBA) protocol of Advanced RISC Machine (ARM) may be applied as the bus standard. Bus types of the AMBA protocol may include an advanced high-performance bus (AHB), an advanced peripheral bus (APB), an advanced extensible interface (AXI), an AXI4, or AXI coherency extensions (ACE). The AXI from among the bus types is interface protocol between IP blocks and provide a multiple outstanding address function and a data interleaving function. Furthermore, it is acceptable to apply different types of protocol such as uNetwork of SONICs Inc., CoreConnect of IBM, open core protocol of OCP-IP, etc., to the interconnect bus 310.

Meanwhile, each IP block of FIG. 20 may be realized as a function block performing a specific operation. For example, the CPU 320 may be a master IP block and may control general operations of the application processor 300. Furthermore, the multimedia unit 330 may include processing devices (e.g., special purpose processors) for encoding and/or decoding an image according to one or more of the above example embodiments. Furthermore, the multimedia unit 330 may perform encoding/decoding operations by a method of encoding/decoding an image according to any one of the above example embodiments. The memory device 340 may include a memory for temporarily storing a variety of information related to an operation of the application processor 300, for example, dynamic random access memory (DRAM). Furthermore, the peripheral circuit 350 may include various interfaces for interfacing with external devices, and may include various peripheral devices for realizing other functions of the application processor 300. For example, the peripheral circuit 350 may include a memory other than the DRAM, or means for accessing an external storage device.

The application processor 300 may be a main processor provided in various terminals such as a mobile device, and the multimedia unit 330 may provide an original image by decoding an encoded bit stream provided to the mobile device, and furthermore, may encode the original image in the mobile device and provide the encoded image as a bit stream. As in the example embodiment described above, the multimedia unit 330 may perform motion estimation and compensation in performing data encoding/decoding operations, and may adjust the complexity by considering image and/or hardware characteristics in performing an interpolation operation capable of being used in the motion estimation and compensation.

Figure 21:
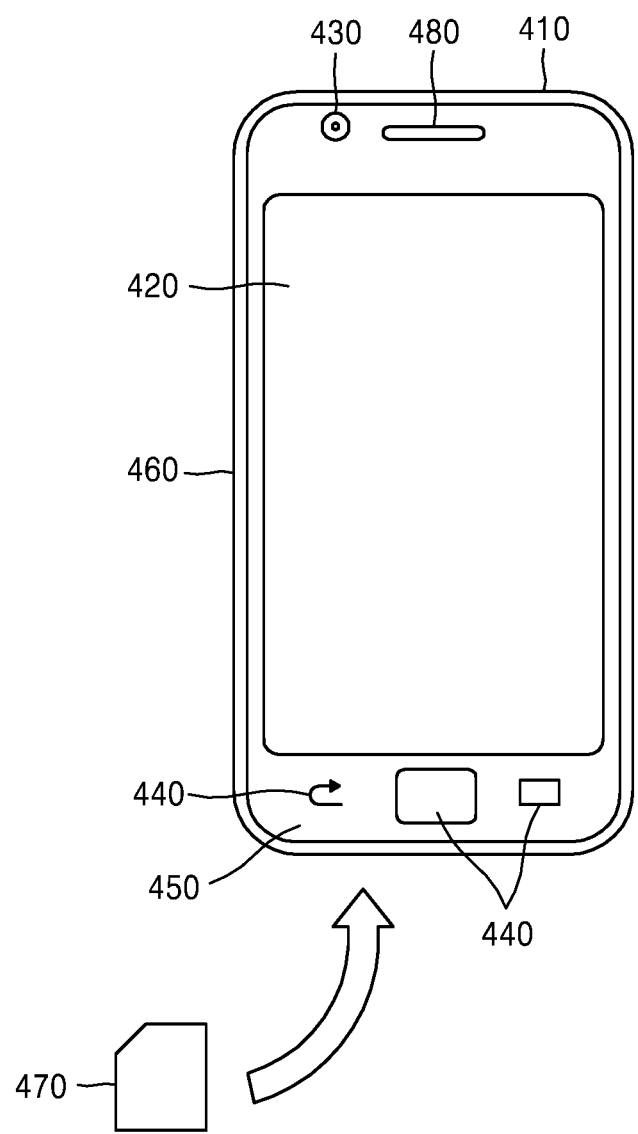
FIG. 21 is a view of a mobile terminal in which a video encoding device is provided according to at least one example embodiment of the inventive concepts.

FIG. 21 is a view of a mobile terminal 400 in which a video encoding device is provided according to at least one example embodiment of the inventive concepts. The mobile terminal 400 may include the application processor 300 of FIG. 20. The mobile terminal 400 may be a smart phone, tablet, wearable device, laptop computer, personal digital assistant (PDA), portable gaming console, GPS-enabled device, other smart device, etc., having functions capable of being changed or extended, without being restricted, by an application program. The mobile terminal 400 may include an antenna 410 and a display 420 such as a liquid crystal display (LCD), or an organic light emitting diodes (OLED) display for displaying images taken by a camera 430, such as a CCD or a CMOS for taking a video and a still image, or images received by the antenna 410 and decoded. The mobile terminal 400 may include an operating panel 440 including at least one user input device, such as a control button, a touch panel, keyboard, mouse, microphone, camera, etc. Furthermore, the display 420 may be a touch screen, and the operating panel 440 may further include a touch sensing panel of the display 420. The mobile terminal 400 may include a speaker 480 for outputting voice and sound or a different type of a sound output unit, and a microphone 450 inputting voice and sound or a different type of a sound input unit. The mobile terminal 400 may further include the camera 430. Furthermore, the mobile terminal 400 may include a storage unit 470 for storing encoded or decoded data such as a video or still images taken by the camera 430, received via E-mail, or obtained by different ways, and a slot 460 for installing the storage unit 470 in the mobile terminal 400. The storage unit 470 may be a different type of a flash memory such as an SD card or electrically erasable and programmable read only memory (EEPROM) included in a plastic case.

An image processing device capable of adjusting computational complexity, an image interpolation method, and an image encoding method according to at least one example embodiment of the inventive concepts may improve accuracy of an interpolation operation and reduce the amount of computation as adjusting computational complexity of the interpolation operation based on image and hardware characteristics.

Furthermore, the image processing device capable of adjusting computational complexity, the image interpolation method, and the image encoding method according to at least one example embodiment of the inventive concepts may reduce a size of a resource required for an interpolation operation by separately setting computational complexity of interpolation operations in horizontal and vertical directions.

The units and/or modules described herein may be implemented using hardware components, software components, or a combination thereof. For example, the hardware components may include microcontrollers, memory modules, sensors, amplifiers, band-pass filters, analog to digital converters, and processing devices, or the like. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors, multi-core processors, distributed processing, or the like.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, or computer storage medium or device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of some example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

It should be understood that example embodiments described herein should be considered in a descriptive sense only and not for purposes of limitation. Descriptions of features or aspects within each device or method according to example embodiments should typically be considered as available for other similar features or aspects in other devices or methods according to example embodiments. While some example embodiments have been particularly shown and described, it will be understood by one of ordinary skill in the art that variations in form and detail may be made therein without departing from the spirit and scope of the claims.

What is claimed is:
1. An image interpolation method comprising:
determining at least one of a read cycle required for reading pixel values and a hardware characteristic associated with an image encoding device;
selecting a horizontal interpolation filter having a first complexity setting based on a result of the determination;
selecting a vertical interpolation filter having a second complexity setting based on the result of the determination;

performing an interpolation operation on an input image using the selected horizontal and vertical interpolation filters;

calculating pixel values of sub-pixels of the input image using results of the interpolation operation; and generating interpolation information regarding the input image related to the selected horizontal interpolation filter and the selected vertical interpolation filter, and the first complexity setting and the second complexity setting are not equal, wherein the selecting the horizontal interpolation filter includes selecting the horizontal interpolation filter having a high complexity setting when pixel values of M pixels are read in parallel during one read cycle of the pixel values, where M is an integer of one or more.

2. The image interpolation method of claim 1, wherein the interpolation operation includes performing horizontal and vertical interpolation on pixel values of a plurality of pixels of the input image, and generating a reference frame having the pixel values of sub-pixels to be used for a motion estimation operation based on the results of the interpolation operation; and the input image is a restored frame which is restored from an encoded original frame.

3. The image interpolation method of claim 2, further comprising:

determining at least one image characteristic required by the restored frame, wherein the first complexity setting and the second complexity setting are selected according to the determined image characteristic.

4. The image interpolation method of claim 3, wherein the determining of the at least one image characteristic of the restored frame includes determining a uniformity characteristic and an edge type required by the restored frame.

5. The image interpolation method of claim 1, wherein the determining of the at least one of the read cycle required for reading pixel values and the hardware characteristic includes, determining the hardware characteristic, performing the interpolation operation by adjusting at least one of the first complexity setting and the second complexity setting, and determining a degree of error of the interpolation operation associated with the results of the interpolation operation; and the method further comprises, selecting the first complexity setting and the second complexity setting according to the determined degree of error.

6. The image interpolation method of claim 1, wherein the number of taps of the selected horizontal interpolation filter and the number of taps of the selected vertical interpolation filter are not equal.

7. The image interpolation method of claim 1, further comprising:

reading pixel values of a plurality of pixels of the input image, wherein the input image is a restored frame which is restored from an encoded original frame;

performing a horizontal interpolation operation using the horizontal interpolation filter with respect to the pixel values of the M pixels arranged horizontally in the restored frame; and performing a vertical interpolation operation using the vertical interpolation filter with respect to pixel values of N pixels arranged vertically in the restored frame, where N is an integer of one or more.

8. The image interpolation method of claim 7, wherein the selecting the vertical interpolation filter includes selecting the vertical interpolation filter having a low complexity setting when the pixel values of N pixels are sequentially read during at least two read cycles of the pixel values; and the selecting the horizontal interpolation filter includes selecting the horizontal interpolation filter having a low complexity setting when the pixel values of M pixels are sequentially read during at least two read cycles of the pixel values.

9. The image interpolation method of claim 1, wherein the interpolation information includes first information indicating whether to adjust the first complexity setting and the second complexity setting, and second information indicating a first complexity setting value and a second complexity setting value.

10. The image interpolation method of claim 9, wherein the first information and second information are included in header information of a bit stream.

11. The image interpolation method of claim 10, wherein the header information includes a sequence parameter set (SPS) network abstraction layer (NAL) IP block and a picture parameter set (PPS) NAL IP block, and each of the first information and second information is included in any one of the SPS NAL IP block and the PPS NAL IP block.

* * * * *